US008639762B2

(12) United States Patent
Rasmussen et al.

(10) Patent No.: US 8,639,762 B2
(45) Date of Patent: Jan. 28, 2014

(54) PROVIDING ACCESS TO A CONVERSATION IN A HOSTED CONVERSATION SYSTEM

(75) Inventors: Jens Eilstrup Rasmussen, Sydney (AU); Lars Eilstrup Rasmussen, Fairlight (AU)

(73) Assignee: Google Inc., Mountain View, CA (US)

( * ) Notice: Subject to any disclaimer, the term of this patent is extended or adjusted under 35 U.S.C. 154(b) by 448 days.

(21) Appl. No.: 12/729,095

(22) Filed: Mar. 22, 2010

(65) Prior Publication Data
US 2010/0241718 A1     Sep. 23, 2010

Related U.S. Application Data

(60) Provisional application No. 61/162,642, filed on Mar. 23, 2009.

(51) Int. Cl.
*G06F 15/16*     (2006.01)

(52) U.S. Cl.
USPC ............................ 709/206; 709/204; 709/205

(58) Field of Classification Search
USPC .......................................... 709/204, 205, 206
See application file for complete search history.

(56) References Cited

U.S. PATENT DOCUMENTS

| | | | |
|---|---|---|---|
| 5,532,715 A | 7/1996 | Bates et al. | |
| 5,671,428 A | 9/1997 | Muranaga et al. | |
| 5,712,995 A | 1/1998 | Cohn | |
| 5,867,678 A | 2/1999 | Amro et al. | |
| 5,900,872 A | 5/1999 | Ashe | |
| 6,006,239 A | 12/1999 | Bhansali et al. | |
| 6,181,736 B1 | 1/2001 | McLaughlin et al. | 375/222 |
| 6,212,548 B1 | 4/2001 | DeSimone et al. | 709/204 |
| 6,693,652 B1 | 2/2004 | Barrus et al. | |
| 6,915,336 B1 | 7/2005 | Hankejh et al. | 709/219 |
| 7,111,044 B2 | 9/2006 | Lee | 709/204 |
| 7,188,140 B1 | 3/2007 | Greenspan et al. | 709/204 |
| 7,188,315 B2 | 3/2007 | Chen et al. | |

(Continued)

FOREIGN PATENT DOCUMENTS

WO     WO 2005/112374 A1     11/2005     .............. H04L 12/58

OTHER PUBLICATIONS

Agarwal, A., "Copy Pictures from Flickr to Picasa Web Albums (or vice-versa)", www.KodakGallery.com/Photo-Albums, Jul. 30, 2007, 2 pages.

(Continued)

*Primary Examiner* — Firmin Backer
*Assistant Examiner* — Jonathan Bui
(74) *Attorney, Agent, or Firm* — Morgan, Lewis & Bockius LLP

(57) ABSTRACT

A server system hosts a plurality of conversations, each having an identified set of participants. For a respective conversation, the server provides content of the conversation to the participants of the conversation. The server receives content from each of a plurality of participants of the conversation and transmits the received content to the other participants of the plurality of participants. Upon an additional participant being added to the conversation, the server provides content of the conversation to the additional participant that includes all content provided to the identified set of participants, and adds the additional participant to the identified set of participants.

23 Claims, 22 Drawing Sheets

(56) References Cited

U.S. PATENT DOCUMENTS

| | | | |
|---|---|---|---|
| 7,222,156 B2 | 5/2007 | Gupta et al. | 709/206 |
| 7,233,951 B1 | 6/2007 | Gainer et al. | |
| 7,272,641 B2 | 9/2007 | Yamagishi | |
| 7,734,589 B1 | 6/2010 | Svendsen | |
| 7,770,130 B1 | 8/2010 | Kaptelinin | |
| 7,774,703 B2 | 8/2010 | Junuzovic et al. | |
| 7,933,952 B2 | 4/2011 | Parker et al. | |
| 7,949,633 B1* | 5/2011 | Shaver et al. | 707/620 |
| 8,086,679 B2 | 12/2011 | Nobori et al. | |
| 2001/0013029 A1 | 8/2001 | Gilmour | |
| 2002/0145631 A1 | 10/2002 | Arbab et al. | |
| 2002/0163545 A1 | 11/2002 | Hii | |
| 2003/0182450 A1 | 9/2003 | Ong et al. | |
| 2004/0260974 A1 | 12/2004 | Livshits | |
| 2005/0010871 A1 | 1/2005 | Ruthfield et al. | |
| 2005/0076068 A1 | 4/2005 | Fowler et al. | |
| 2005/0108402 A1 | 5/2005 | Colson et al. | |
| 2005/0149879 A1 | 7/2005 | Jobs et al. | |
| 2005/0166154 A1 | 7/2005 | Wilson et al. | 715/751 |
| 2006/0026502 A1 | 2/2006 | Dutta | |
| 2006/0053194 A1 | 3/2006 | Schneider et al. | |
| 2006/0080432 A1* | 4/2006 | Spataro et al. | 709/224 |
| 2006/0117247 A1 | 6/2006 | Fite et al. | |
| 2006/0123353 A1 | 6/2006 | Matthews et al. | |
| 2006/0136511 A1 | 6/2006 | Ngo et al. | |
| 2006/0136821 A1 | 6/2006 | Barabe et al. | |
| 2006/0161516 A1 | 7/2006 | Clarke et al. | |
| 2006/0268020 A1 | 11/2006 | Han | |
| 2006/0277210 A1 | 12/2006 | Starbuck | |
| 2007/0130257 A1 | 6/2007 | Bedi et al. | 709/204 |
| 2007/0136270 A1 | 6/2007 | Harney et al. | |
| 2007/0136662 A1 | 6/2007 | Khaba | |
| 2007/0198648 A1 | 8/2007 | Allen et al. | 709/207 |
| 2007/0203886 A1 | 8/2007 | Epstein et al. | |
| 2007/0233811 A1 | 10/2007 | Rochelle et al. | |
| 2007/0250506 A1 | 10/2007 | Stevens et al. | |
| 2007/0271340 A1 | 11/2007 | Goodman et al. | 709/206 |
| 2008/0037726 A1 | 2/2008 | Yao et al. | |
| 2008/0066106 A1 | 3/2008 | Ellis et al. | |
| 2008/0147695 A1* | 6/2008 | Masek | 707/101 |
| 2008/0172607 A1 | 7/2008 | Baer | |
| 2008/0178076 A1 | 7/2008 | Kritt et al. | |
| 2008/0215588 A1* | 9/2008 | Mattheisen | 707/9 |
| 2008/0250114 A1 | 10/2008 | Dubovsky et al. | |
| 2008/0250329 A1 | 10/2008 | Stefik et al. | |
| 2009/0006936 A1* | 1/2009 | Parker et al. | 715/200 |
| 2009/0055483 A1* | 2/2009 | Madan et al. | 709/206 |
| 2009/0070301 A1* | 3/2009 | McLean et al. | 707/3 |
| 2009/0083384 A1* | 3/2009 | Bhogal et al. | 709/206 |
| 2009/0112937 A1 | 4/2009 | Campbell et al. | |
| 2009/0157811 A1* | 6/2009 | Bailor et al. | 709/204 |
| 2009/0177744 A1 | 7/2009 | Marlow et al. | |
| 2009/0192845 A1* | 7/2009 | Gudipaty et al. | 705/7 |
| 2009/0199127 A1 | 8/2009 | Sareen et al. | |
| 2009/0199274 A1* | 8/2009 | Frazier et al. | 726/4 |
| 2009/0228555 A1 | 9/2009 | Joviak et al. | |
| 2009/0234876 A1 | 9/2009 | Schigel et al. | |
| 2009/0235181 A1 | 9/2009 | Saliba et al. | |
| 2009/0248497 A1 | 10/2009 | Hueter | |
| 2009/0271696 A1 | 10/2009 | Bailor et al. | |
| 2009/0271806 A1 | 10/2009 | McDonald et al. | |
| 2009/0275412 A1* | 11/2009 | Green | 463/42 |
| 2009/0276471 A1 | 11/2009 | Baer et al. | |
| 2009/0307345 A1 | 12/2009 | Carter et al. | |
| 2009/0313331 A1 | 12/2009 | Rasmussen et al. | |
| 2009/0319910 A1 | 12/2009 | Escapa et al. | |
| 2009/0327448 A1 | 12/2009 | Williams et al. | |
| 2010/0023557 A1* | 1/2010 | Sureshkumar | 707/200 |
| 2010/0077338 A1 | 3/2010 | Matthews et al. | |
| 2010/0169269 A1 | 7/2010 | Chandrasekaran | |
| 2010/0174783 A1 | 7/2010 | Zarom | |
| 2010/0180218 A1* | 7/2010 | Boston et al. | 715/759 |
| 2010/0235216 A1* | 9/2010 | Hehmeyer et al. | 705/9 |
| 2010/0306185 A1 | 12/2010 | Smith et al. | |
| 2011/0010447 A1* | 1/2011 | Fox et al. | 709/224 |

OTHER PUBLICATIONS

Balasubramanyan, R., "Cut Once, A Thunderbird Extension for Recipient Prediction and Leak Detection," http://www.cs.cmu.edu/~vitor/cutonce/cutOnce.html, Oct. 29, 2009, 5 pages.

Carvalho, V., "Cut Once—A Thunderbird Extension for Recipient Prediction and Leak Detection," vitor@cs.cmu.edu, Jan. 19, 2008, 3 pages.

Carvalho, V., "Ranking Users for Intelligent Message Addressing," ECIR '08 Proceedings of the IR Research, 30th European Conference on Advances in Information Retrieval, Springer-Verlag Berlin, Heidelberg, 2008, 12 pages.

Comer, D., "Conversation-Based Mail", ACM Transactions on Computer Systems, vol. 4, No. 4, Nov. 1986, 21 pages.

NetWin Advanced Server Software, "Dbabble Instant Chat Server Overview," http://free.dbabble.com/, 2009, 3 pages.

Dear, B., "Term-Talk: Plato's Instant Messaging," brian@platohistory.org, Dec. 19, 2002, 2 pages.

Twitter, "Display twitters on Your Web Page," http://twitter.com, Feb. 22, 2008, 1 page.

Dodgeball.com, Mobile Social Software, http://www.dodgeball.com/, Feb. 23, 2008, 2 pages.

Flickr, Help/the Help Forum, "Anyone can tell me how to copy all photos from Flickr another album gallery from the other website?" http://www.flickr.com/help/forum/en-us/62736, 2008, 3 pages.

Flock Browser-Share Pictures, Text and Video, "User Guides," http://www.flock.com/user-guide/1.0/advshar.html, Feb. 22, 2008, 8 pages.

Plasq, "Ask a question, share an idea, report a problem, or just talk.," fetsatisfaction.com/.../Iwish_i_could_drag_drop_directly_into_a_file_upload_field_in_safari_firefox—cached, Aug. 29, 2007, 2 pages.

Help Yahoo Messenger, How do I share photos during a conversation? http://help.yahoo.com/1/us/yahoo/messenger/messenger9/entertainment/entertainment-38.h . . . , Feb. 22, 2008, 1 page.

Hu, J., Microsoft wins . . . is typing a message IM patent, Oct. 8, 2003, 2 pages.

International Search Report and Written Opinion, PCT/US2010/28269, Jan. 26, 2011, 8 pages.

International Search Report and Written Opinion, PCT/US2010/028277, Mar. 31, 2011, 8 pages.

Grob R., "Cluestr: Mobile Social Networking for Enhanced Group Communication," Group 09, May 10-13, 2009, 10 pages.

Lavalle, A., "Friends Swap Twitters, and Frustration," The Wall Street Journal, Mar. 16, 2007, 3 pages.

Microsoft Office Online, Help and How-to Move or and Paste Contacts, http://office.microsot.com/en-us/help/HA102084691033.aspx?mode=print, 2008, 2 pages.

Nichols, D., "High-Latency, Low-Bandwidth Windowing in the Jupiter Collaboration System," Proceedings of UIST '95, 10 pages.

Payne, A., "Google Groups, Twitter Development Talk," http://groups.google.com/group/twitter-development-talk/web/api-documentation, Jan. 18, 2008, 11 pages.

Saviano, S., "Annagram Concurrent Text Editor," Penn Engineering, 2006, 2 pages.

Twitter/Sifow, "Name Sifow," http://twitter.com/sifow/with_friends, 2008.

Twitter Support, "Twitter FAQ," http://help.twitter.com/index.php?pg=kb.printer,friendly&ie=3, 2008, 8 pages.

Webb, C., Chris Webb on Publishing, Media, and Technology, http://ckwebb.com/social-networks-and-media/twitter-is-a-conversation-ecosystem/, Feb. 22, 2008, 8 pages.

Webb, C., "What's the Use in Twitter? Where is the Value?" http://ckwebb.com/blogging/what-the-use-in-twitter-where -is-the-value/, Aug. 15, 2007, 5 pages.

Google, Inc., PCT/US2010/028272, Mar. 23, 2010, International Search Report and Written Opinion dated Aug. 30, 2011, 10 pgs.

Cayenne-McCall, Synchronous 3D Document Collaboration, Nov. 2008, pp. 1-38.

Day-Richter, What's different about the new Google Docs: Making collaboration fast, Sep. 23, 2010, 6 pgs.

Google Inc., International Search Report and Written Opinion, PCT/US2011/058607, Feb. 21, 2012, 12 pgs.

(56) References Cited

OTHER PUBLICATIONS

Herrick, Google This! Using Google Apps for Collaboration and Productivity, Jan. 1, 2009, pp. 55-63.
Shen, Flexible Merging for Asynchronous Collaborative Systems, Jan. 1, 2002, 18 pgs.
Wang, Google Wave Operational Transformation, Jul. 2010, 6 pgs.
Fleishman, EtherPad Brings Simultaneous Writing to the Web, TidBITS, Feb. 16, 2009, 3 pgs.
Google Inc., Notification of the First Office Action, CN 201080013719.9, Mar. 27, 2013, 5 pgs.
XmScrollBar (3x), techpubs.sgi.com, Jan. 31, 2001, 7 pgs.

\* cited by examiner

PROVIDING ACCESS TO A CONVERSATION IN A HOSTED CONVERSATION SYSTEM

RELATED APPLICATIONS

This application claims priority to U.S. Provisional Patent Application No. 61/162,642, filed Mar. 23, 2009, entitled "Hosted Conversation System," which is incorporated herein by reference in its entirety.

This application is related to U.S. patent application Ser. No. 12/729,104, filed Mar. 22, 2010, entitled "System and Method for Editing a Conversation in a Hosted Conversation System," which is incorporated herein by reference in its entirety.

This application is related to U.S. patent application Ser. No. 12/729,107, filed Mar. 22, 2010, entitled "System and Method for Merging Edits for a Conversation in a Hosted Conversation System," which is incorporated herein by reference in its entirety.

This application is related to U.S. patent application Ser. No. 12/770,654, filed Apr. 29, 2010, entitled "Participant Suggestion System." This application is further related to U.S. Provisional Patent Application No. 61/182,067, filed May 28, 2009, entitled "Participant Suggestion System," which is incorporated herein by reference in its entirety.

This application is related to U.S. patent application Ser. No. 12/789,408, filed May 27, 2010, 2010, entitled "Enhanced User Interface Scrolling System." This application is further related to U.S. Provisional Patent Application No. 61/182,068, filed May 29, 2009, entitled "Enhanced User Interface Scrolling System," which is incorporated herein by reference in its entirety.

This application is related to U.S. patent application Ser. No. 12/789,413, filed May 27, 2010, entitled "Content Upload System with Preview and User Demand Based Upload Prioritization." This application is further related to U.S. Provisional Patent Application No. 61/182,071, filed May 29, 2009, entitled "Content Upload System with Preview and User Demand Based Upload Prioritization," which is incorporated herein by reference in its entirety.

TECHNICAL FIELD

The disclosed embodiments relate generally to communication systems. More particularly, the disclosed embodiments relate to methods, systems, and user interfaces for transmitting, receiving, and rendering electronic messages.

BACKGROUND

A variety of electronic communications systems, including electronic email ("email") systems and instant messaging (IM) system are well known. In both email and IM systems, individual messages can be forwarded and replied to. However, for both email and IM, responding to portions of a message or forwarding portions of a message is relatively difficult or awkward. Further, for a conversation with several levels (e.g., a conversation that includes multiple messages and responses on different topics or subtopics) it can be difficult to discern the logical context of at least some of the messages in the conversation. Similarly, the logical context of a conversation can get lost if a participant joins the conversation mid-way through.

Instant messaging is sometimes called electronic chat. A popular electronic chat program is, for example, Instant Messenger, a trademark of America Online. Electronic chat is comparable to a telephone conversation in terms of function and structure. There is generally no logical structure to an electronic chat conversation, just a timeline.

As users access electronic messages from a plurality of devices (e.g., laptop, mobile phone, electronic pager, set top box, etc.) it would be helpful to have full access to entire conversations from each of these devices, and to be able to discern the logical context, within a conversation, of each user contribution to the conversation.

SUMMARY OF DISCLOSED EMBODIMENTS

In one aspect of the invention, a server system hosts a plurality of conversations, each having an identified set of participants. For a respective conversation, the server system provides content of the conversation to the participants of the conversation. The server system receives content from each of a plurality of participants of the conversation and transmits the received content to the other participants of the plurality of participants. Upon an additional participant being added to the conversation, the server system provides content of the conversation (e.g., including the portions of the conversation that took place in the past) to the additional participant that includes all content provided to the identified set of participants, and adds the additional participant to the identified set of participants. In some embodiments instructions for performing the operations described above are stored in a computer readable storage medium of the server system for execution by one or more processors of the server system. In some embodiments, the server system has one or more processors, memory, and one or more programs having instructions for performing the operations described above, wherein the one or more programs are stored in the memory and configured to be executed by the one or more processors so as to perform the instructions.

In another aspect of the invention, a server system hosts a plurality of conversations. For a respective conversation, the server system provides content of the conversation to a plurality of clients associated with participants of the conversation. The server system provides content of the conversation to a plurality of client associated with participants of the conversation, providing to each client all content of the conversation that the client has been configured to receive. The server system receives content from respective participants of the conversation and transmits to the clients associated with other participants at least a portion of the received content. Upon an additional participant being added to the conversation, the server system provides to a client associated with the additional participant all content of the conversation that the client associated with the additional participant has been configured to receive. In some embodiments instructions for performing the operations described above are stored in a computer readable storage medium of the server system for execution by one or more processors of the server system. In some embodiments, the server system has one or more processors, memory, and one or more programs having instructions for performing the operations described above, wherein the one or more programs are stored in the memory and configured to be executed by the one or more processors so as to perform the instructions.

In another aspect of the invention, at least one of one of a plurality of server systems, each associated with a different subset of users, hosts at each respective server system conversations initiated by the respective subset of users. A respective server system receives content from respective participants of a conversation and transmits to clients associated with other participants of the conversation at least a portion of the received content. Upon an additional participant being added to the conversation, the server system provides to a client associated with the additional participant all content of the conversation that the client associated with the additional participant has been configured to receive. In some embodiments, providing the content includes providing a uniform view of the conversation to a plurality of the participants. In some embodiments instructions for performing the operations described above are stored in a computer readable storage medium of the server system for execution by one or more processors of the server system. In some embodiments, the server system has one or more processors, memory, and one or more programs having instructions for performing the operations described above, wherein the one or more programs are stored in the memory and configured to be executed by the one or more processors so as to perform the instructions.

BRIEF DESCRIPTION OF THE DRAWINGS

Various embodiments of the invention are disclosed in the following Description of Embodiments herein, in conjunction with the following drawings in which like reference numerals refer to corresponding parts throughout the figures.

Like reference numerals refer to corresponding parts throughout the drawings.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention can be practiced without these particular details. In other instances, methods, procedures, components, and networks that are well known to those of ordinary skill in the art are not described in detail to avoid obscuring aspects of the present invention.

Figure 1:
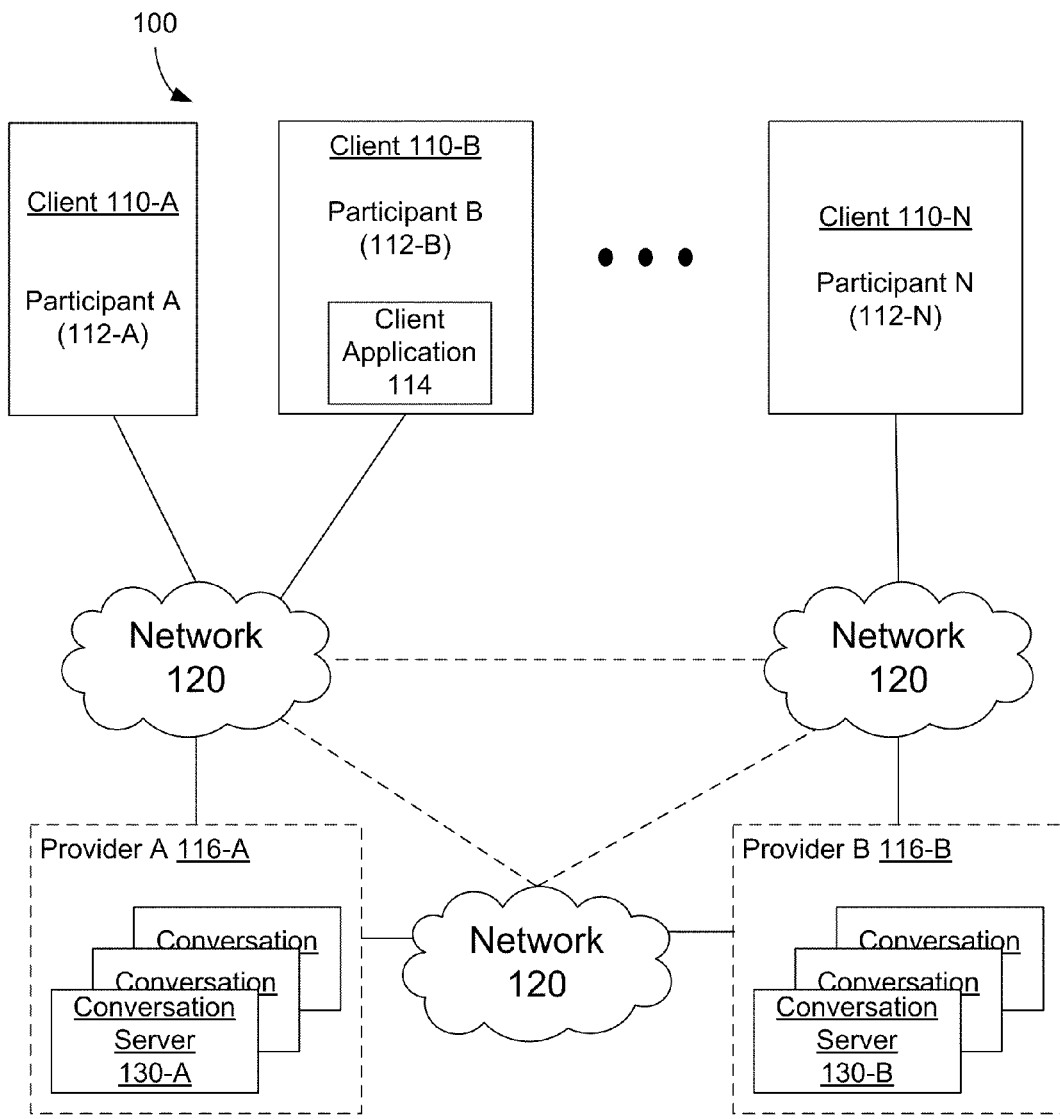
FIG. 1 is a block diagram illustrating an exemplary distributed computer system according to certain embodiments of the invention.

FIG. 1 is block diagram illustrating an exemplary distributed computer system 100 according to certain embodiments of the invention. Computer system 100 includes a plurality of clients 110. Users of the clients 110 (also herein called client devices or client systems) are participants 112 in conversations hosted by a set of conversation servers 130 (sometimes called a conversation server system). The clients 100 can be any of a number of computing devices (e.g., Internet kiosk, personal digital assistant, cell phone, gaming device, desktop computer, laptop computer, handheld computer, tablet computer, or combinations thereof) used to enable the activities described below. Each client 110 is coupled to a network 120, which can be any of a number of networks (e.g. Internet, intranet, local area network, wide area network, wireless network, wired network, optical network, or a combination of such networks). More generally, the clients 100 and conversation servers 130 are coupled to each other via one or more communication networks 120.

A respective client 110-B executes a client application 114 that facilitates access from the client 110 to a respective hosted conversation server 130. The client application 114 may include a graphical user interface. For example, the client application may be a web browser or other browser application, such as Firefox (trademark of Mozilla Foundation), Internet Explorer (trademark of Microsoft Corporation), Safari (trademark of Apple Inc.), or Chrome (trademark of Google Inc.).

While a system 100 may have a single conversation server 130, in other embodiments the system 100 may have multiple conversation servers 130. For example, multiple conversation servers 130-A and 130-B may be hosted by different service providers, such as providers 116-A and 116-B respectively. In some embodiments, the providers are internet service providers (ISPs) providing a conversation service. Alternately, some or all of the providers may be dedicated conversation providers. When the system 100 includes multiple conversation servers 130, the conversation servers 130 may be coupled together directly, or by a local area network (LAN), or via the network 120.

The conversation server(s) 130 host conversations between participants 112. More specifically, each conversation server 130 hosts conversations on behalf of a set of users. At least some of those users are subscribers of the hosted conversation system 100 and thus have user accounts. As described in more detail below, some of the conversation participants need not be subscribers of the hosted conversation system. When new content is added to a conversation by any participant, or any other changes are made to a conversation by any participant, the updates are sent to all the conversation servers 130 that host conversations for the participants in the conversation. Those host servers, in turn, send the updates to the clients 110 being used participants in the conversation. The conversation updates may be sent relatively instantaneously (e.g., within a second or two) to the clients 110 of active participants in the conversation. Optionally, clients 110 of passive participants 112 who are online and logged into the conversation system 100, but who are not currently viewing the conversation or are not current participating in the conversation, receive information that the conversation has been updated, without receiving the updates to the conversation. In at least some embodiments, when the participant "opens" the conversation (selects it for viewing), the updated conversation is downloaded to the participant's client from conversation server 130 that hosts conversations for that user.

Figure 2:
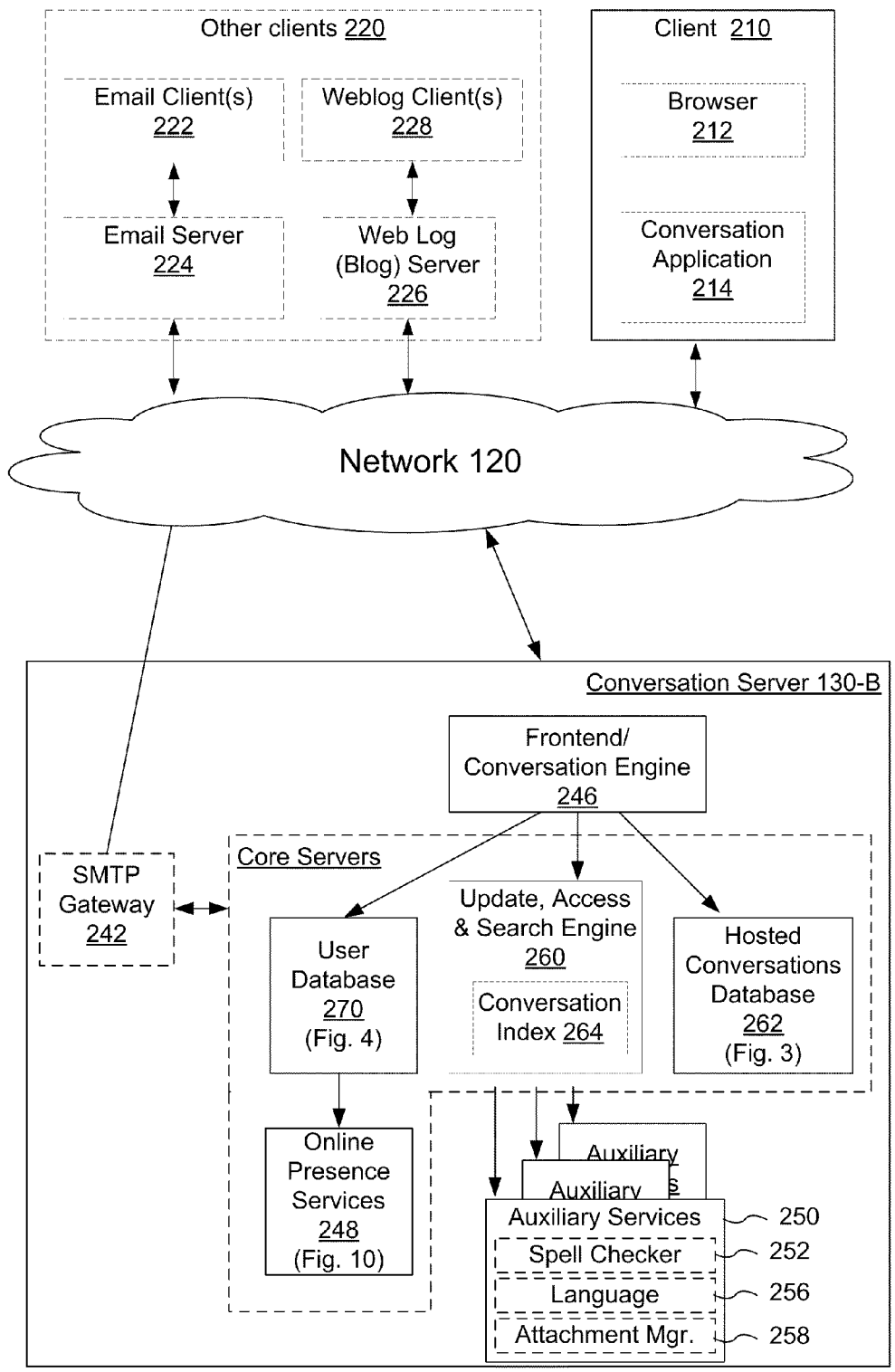
FIG. 2 is a block diagram of a distributed system including a conversation server and clients coupled by one or more communication networks, according to certain embodiments of the invention.

FIG. 2 is a block diagram of system 200 illustrating exemplary embodiments of a conversation server 130 and client systems 210 and 220. System 200 includes a communications network 120, as described above, coupled between a conversation server 130 and a plurality of the clients, including client 210. Client 210 corresponds to a respective client 110 of FIG. 1, and is sometime herein called a "participant client" because the user of client 110/210 is a participant in one or more conversations hosted by the conversation server 130. System 200 includes at least one participant client 210. Participant client 210 optionally includes a browser 212, such as a web browser, or other client application to facilitate participant interaction with a respective conversation server 130. The browser 212 typically includes (or controls) a virtual machine (e.g., a Java virtual machine) for executing software embedded in web pages and other documents rendered by the browser 212. In some embodiments, the browser 212 executes a conversation application 214 that is embedded, at least in part, in a web page. The web page (which may be called a "hosted conversation web page") is downloaded from a server, such as a conversation server 130, to the client 210 and includes executable instructions that are executed by the virtual machine of the browser 212 in the client 210. The browser 212 and conversation application 214 together form the client application 114 of FIG. 1. The conversation application 214 facilitates participant interaction with the conversation server system 130.

In some other embodiments, conversation application 214 is a plug-in or extension of the browser application 212.

System 200 optionally includes non-subscriber clients 220. Non-subscriber clients 220 enable users who do not have accounts in the conversation system to participate, in at least a limited manner, in hosted conversations. Participation in hosted conversations may be limited in a number of ways, for example by allowing the user of a non-subscriber client to read the content of a conversation, and allowing the user to contribute new content, but not allowing the user of the non-subscriber client to use other features such as editing content already in the conversation, responding to specific portions of content previously contributed by other participants, and playing back a conversation.

Non-subscriber clients 220 access the conversation server system 130 in a manner that is distinct from the manner used by clients 210 whose users are subscribers of the hosted conversation system. An example of a non-subscriber client 220 is a weblog ("blog") server 226, having a weblog client 228. As described below, a hosted conversation can include a weblog 228 (also called a weblog client) as a participant in the conversation, in which case content of the hosted conversation is published in the weblog. The published conversation is visible on the weblog 228, which is hosted by the weblog server 226. More specifically, when a weblog 228 is added as a participant to a conversation, content of the conversation is transmitted to (also called "posted to") the weblog 228 by the conversation server 130 that hosts the conversation. After the weblog 228 is added as a participant, new content added to the conversation is also transmitted to the weblog 228 by the conversation server 130 that hosts the conversation. A user (e.g., a user of another client 110, FIG. 1) who views content of the weblog 228 (e.g., by visiting a URL associated with the weblog 228, hosted on the weblog server 226) can view content of the conversation published on the weblog.

Another example of a non-subscriber client 220 is an email server 224, having email clients 222. Content from host conversations can be sent to one or more email clients 222 of one or more email servers 224. In particular, when the user of an email client 222 is added as a participant to a conversation, content of the conversation (and content subsequently added to the conversation) is transmitted to the email client 222 by the conversation server 130 that hosts the conversation.

Weblogs and email servers are also examples of "automated clients." Other examples of automated clients include services, such as archival services, translation services, spell-check and grammar-check services, that may be invoked to provide services to other participants of a hosted conversation.

In some embodiments, email clients 222 and weblog clients 228 can read but cannot provide content to a hosted conversation, and thus are just observers. However, in some other embodiments, authoring capabilities (the ability to provide content to a conversation) are provided to at least some "email participants" (i.e., users of email clients) or "weblog participants" (i.e., weblog clients).

In some embodiments, a conversation server 130 includes a front-end or conversation engine 246 for managing conversations and communications with clients, and one or more auxiliary services (modules, applications or servers) 250 for managing services related to conversations. In some embodiments, auxiliary services 250 include spell checking 252, language translation or localization 256, and managing attachments 258 to conversations. Conversation server 130 also includes online presence services 248, enabling users to know the online status of other users (e.g., other subscribers of the hosted conversation system), as described in detail below with reference to FIG. 6. Server 130 includes a user database 270, described in detail below with reference to FIG. 4.

The front-end or conversation engine 246 utilizes (or, alternately includes) an update, access and search/query engine 260 to provide participant access to conversations, and to provide search functions in conversations. In some embodiments, one or more conversation indexes 264 are inverse indexes, mapping words or terms in conversations to the conversations in which they occur. The one or more conversation indexes 264 are used to find conversations in a hosted conversation database 262 that match specified search queries. As content is added to conversations in the conversation database 262 the one or more conversation indexes 264 are updated with that content so as to make the added content accessible by the execution of search queries. The conversation database 262 is described in more detail below with reference to FIG. 3.

Optionally, conversation server 130 includes an SMTP gateway 242 for facilitating email communication with one or more email servers 224.

In the discussion below, a subscriber is a user for whom a conversation server 130 (e.g., any conversation server 130 in a set of conversation servers 130 that provide conversation services) maintains a user record or profile (see 402, FIG. 4, as described below).

As described in more detail below, in some embodiments, the conversation server 130 maintains for a respective user/subscriber a list 414 (FIG. 4) of conversations in which the user/subscriber is a participant. The conversation server 130 updates the status (conversation state 438-1, FIG. 4) of each such conversation in the user's conversation list 414 when the state of the respective conversation changes. When (e.g., in response to a search/query from the user) the conversation server 130 sends to the user a requested list of conversations (typically comprising a subset of the complete set of conversations in which the user is a participant), the list includes status information for the listed conversations. The status information in the returned list is generally a subset of the conversation state 438, as only a portion of the conversation state (e.g., whether there is any content in the conversation that has not yet been viewed by the user) is needed when displaying the list of conversations.

Figures 3A, 3B:
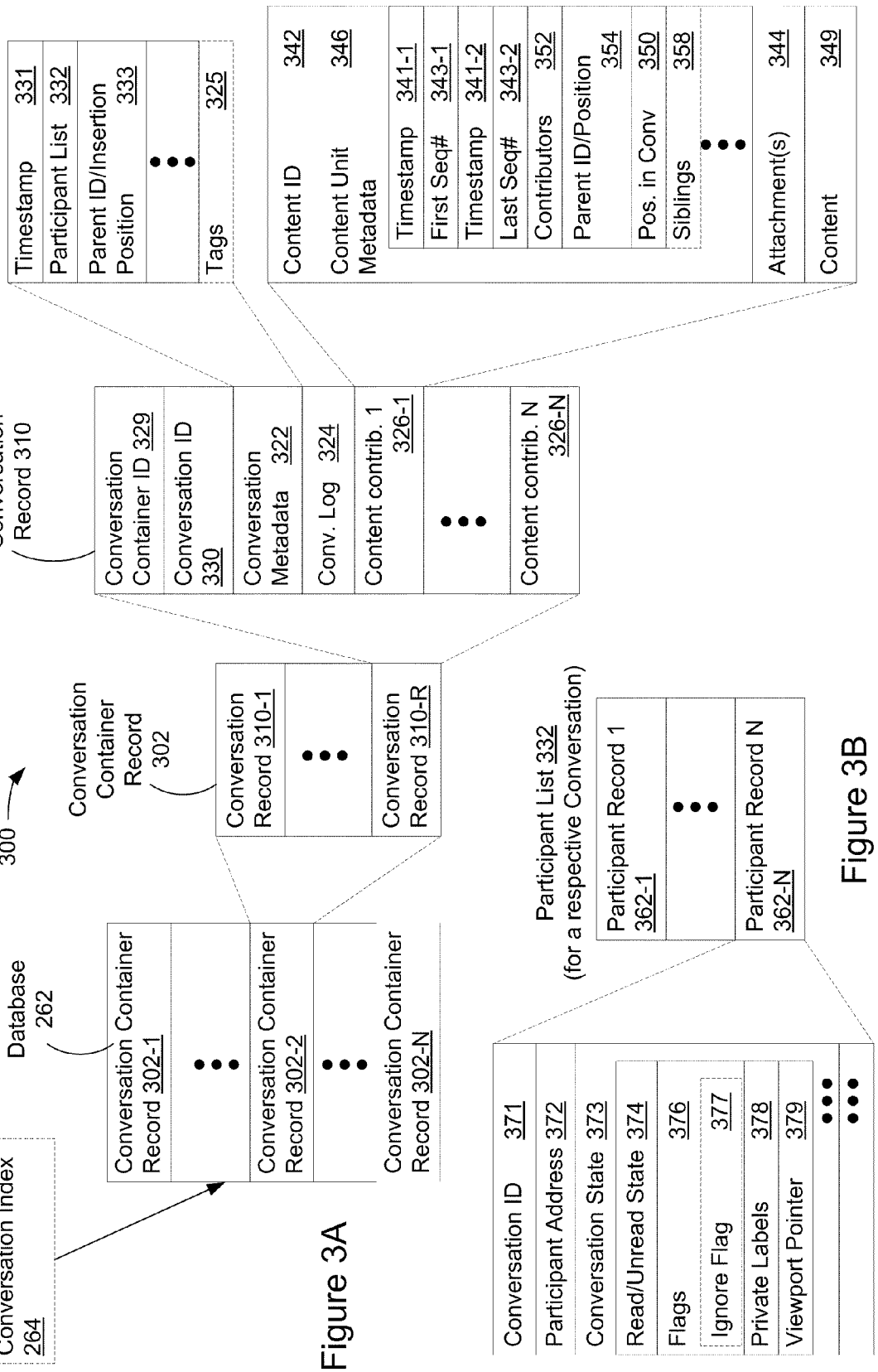
FIGS. 3A-3C are block diagrams of data structures for a conversation database, a participant list and a conversation log, respectively, according to certain embodiments of the invention.

FIG. 3A is a block diagram illustrating exemplary data structures for conversation database 262. While most conversations have a single set of participants that share all the content of the conversation, some conversations, herein called conversation containers, have a more complicated structure. In particular, a first conversation can result in any number of "side conversations" by various subsets of the participants in the first conversation, and can even include additional participants. For example, a conversation container can be used by two or more teams of participants (e.g., Team A and Team B) to negotiate an agreement, or to co-edit a document or presentation or the like. To accommodate the needs of all the participants, an initial conversation (sometimes called the primary conversation or master conversation) is started among all the participants, and then "private conversations" are spawned off the initial conversation to enable participants in each of the teams to communicate privately with other participants of the team, while still having access to all of the content of the initial conversation. Typically, each private conversation has a set of participants that excludes at least one participant in the primary conversation. Optionally, a private conversation can include one or more additional participants (e.g., a consultant) who is not a participant in the primary conversation. Each participant only has access to the content of the conversations in which they are a participant. Typically, the participants on Team A have access to the content of both the Team A private conversation and the primary conversation, and the participants on Team B have access to the content of both the Team B private conversation and the primary conversation.

FIG. 3A is a block diagram of exemplary data structures that support both simple conversations (i.e., single conversations with no related private conversations) as well as conversation containers that include multiple conversations (sometimes called a primary conversation and one or more sub-conversations).

Conversation database 262 includes a plurality of conversation container records 302-1 to 302-N, each containing the data for a conversation container. When a respective conversation container has only one conversation, the only information in the corresponding conversation container record 302 is for the single conversation, as represented by one conversation record 310. More generally, a conversation container record 302 includes one or more conversation records 310-1 to 310-C. Each conversation record 310 contains data for a respective conversation, including:

- conversation container identifier 329, which uniquely identifies the conversation container in the conversation system 110/200 that corresponds to the conversation container record 302 in which the conversation record 310 is located;
- conversation identifier 330, which in combination with the conversation container identifier 329 uniquely identifies the conversation in the conversation system 100/200 that corresponds to the conversation record 310 (i.e., a conversation can only be associated with a single conversation container);
- conversation metadata 322;
- conversation log 324 (sometimes called the history log); and
- one or more content contributions 326-1 to 326-n; and
- a history log 360.

Conversation metadata 322 is metadata for the conversation corresponding to the conversation record 310 and identified by conversation identifier 310. In some embodiments, the conversation metadata 322 includes a conversation creation timestamp 331 (indicating the date and time the conversation was created), and a list of participants 332 (described in more detail in FIG. 3B) for the conversation. The metadata 322 may optionally include other metadata, such as metadata identifying tags 325 (e.g., system and/or user assigned labels that are "public," and thus available to all participants in the conversation) associated with the conversation, and other characteristics of the respective conversation associated with the conversation record 310.

When a conversation container contains more than one conversation, the participant list 332 for the primary conversation of the conversation container will typically include all the participants in all the conversations in the conversation container. However, in some embodiments, private conversations (i.e., conversations other than the primary conversation) in the conversation container can have additional participants that are not participants of the primary conversation. Thus, each of the private conversations in a conversation container will typically have a participant list 332 that includes at least one of the participants in the primary conversation of the same conversation container, and optionally includes one or more participants who are not participants in the primary conversation of the same conversation container.

In addition, when a conversation container contains more than one conversation, a parent ID/insertion position 333 is provided for each of the private conversations, but not for the primary conversation. The parent ID/insertion position 333 identifies the parent of the private conversation, as well as the position in the identified parent conversation at which content of the private conversation should be inserted when viewed by participants of the private conversation. Typically the parent of a private conversation is the primary conversation of the conversation container, but in some instances the parent of a private conversation can be another parent conversation that is higher up in the hierarchy (or graph) of conversations in the conversation container. When a participant of a private conversation views the conversation container that includes the private conversation, the content of both the parent conversation and the private conversation will be seen (assuming the participant is also a participant of the parent conversation). In the less common situation, in which a user is a participant of a private conversation, but is not a participant in the parent conversation, the user will see only the content of the conversation (or conversations) in the conversation container for which they are a participant.

In some embodiments, the conversation log 324 (FIG. 3C) records all changes to the conversation, including changes to the content of the conversation as well as to the set of participants and other characteristics of the conversation. The conversation log 324 is accessed when participants ask to see the state of the conversation, or a content unit of the conversation, at one or more points in time. For example, the conversation log 324 can be used to reconstruct or review the sequence of edits made to a content unit of the conversation. This is sometimes called "playing back" or "playback" of the conversation. Playback of a conversation can be performed in a variety of ways, including time forward or time backward, and showing updates to just a portion of the conversation or to the entire conversation.

A respective content contribution 326 (also called a content unit, or "blip") in a conversation can be a message, much like an email message or instant message. Other content contributions 326 in a conversation can be documents (e.g., a report, meeting agenda, etc.), pictures, presentations, audio files, video files, or virtually any other type of electronic document or content. In some embodiments, there are few if any distinctions between email messages and other types of content contributions to a conversation. In some embodiments, the data in a conversation record 310 for each content contribution 326 includes:

- a content identifier 342 (e.g., a value uniquely identifying the content contribution, either globally within the conversation system, or locally within a particular conversation);
- content unit metadata 346, identifying characteristics of the content contribution 326;
- optionally, one or more attachments 344 (e.g., pictures, videos, documents, files, archives, audio, animations, links, etc.); and
- the content 349 (e.g., text, images, document content, etc.) of the content contribution 326.

In some embodiments, content unit metadata 346 for a content unit 326 includes:

- a first timestamp 341-1 denoting the date and time the content unit was first created (added to the conversation), and a corresponding sequence number 343-1 corresponding to the state of the conversation when the content unit was first created;
- a last timestamp 341-2 denoting the last date and time that the content unit was edited, and a corresponding sequence number 343-2 corresponding to the state of the conversation when the last edit to the content unit was made; having both the first and last timestamps and sequence numbers is useful (for example) when playing back changes to the content unit, or when playing back changes to a portion of the conversation that includes the content unit; and
- identifiers 352 (e.g., participant addresses) of the content unit's contributors or author(s), optionally ordered by the order of first contributions of each author to the content unit; while most content units have a single author, content units can be written collaboratively, in which case they have multiple authors.

In some embodiments, the metadata 346 for a content unit 326 also includes one or more of the following:

- parent identifier 354 provides an identifier of or pointer to the parent content unit to which this content contribution is a response or reply;
- position 350 provides an indicator of the position of this content unit in a conversation); the position 350 may be used to govern how the content unit is displayed when displaying two or more content units of the conversation; and
- optionally, siblings 358 of this content contribution (i.e., identifiers or pointers to sibling content units, which are other responses or replies to the parent of this content unit).

Typically, the metadata 346 for a content unit 326 includes at least one value (e.g., position 350 or parent identifier 354) that identifies or represents the position of the content unit 326 in the conversation.

A conversation index 264 (see FIG. 2) enables fast access to conversations in the conversation database 262 through searches of the index.

FIG. 3B is a block diagram illustrating data structures for the participant list 332 in the conversation metadata 322 (FIG. 3A) of a conversation record 310. A participant list 332 includes a plurality of participant records 362, one for each participant in a respective conversation. In some embodiments, each participant record 362 includes the following information, or a subset of the following information:

- a conversation identifier 371;
- a participant address 372, which may also be called a participant identifier; the participant address uniquely identifies the participant among all the participants in conversations in the conversation system 100 (FIG. 1);
- a per-user conversation state 373; for example, the conversation state 373 may indicate the read/unread state 374 of this conversation with regard to the respective participant corresponding to participant record 362; the conversation state 372 may include information about which content contributions in the conversation have been viewed by the participant, and which have not yet been viewed;
- the conversation state 373 for a conversation participant may include flags 376; optionally, the flags 376 may include an ignore flag 377 (also sometimes called the mute flag), which if present, indicates that the participant has instructed the conversation system not to notify the participant of updates to the conversation;
- the conversation state 373 for a conversation participant may include private labels (sometimes called "folders" or "folder designations") 378 assigned by this participant to this conversation, which are for use only by this participant (e.g., when searching for conversations, the participant can include a private label as one of the query terms); private labels can be applied by participants to help organize their conversations and to make it easy to locate conversations based, in part, on what labels have been applied to them; it is noted that tags 325 are public information, available to all participants in a conversation, while the private labels of each participant are private to that participant;
- the conversation state 373 for a conversation participant may include a viewpoint pointer 379, which indicates either the portion of the conversation currently being viewed by the participant (and the position of the user's cursor within a respective content unit if the user is entering or editing a content unit), or the portion of the conversation last viewed by the participant if the participant is not currently displaying or viewing the conversation;

optionally, other metadata related to this respective participant with respect to this particular conversation.

Another optional flag 376 in the per-user conversation state 373 for a respective participant is a reminder flag. When included in the per-user conversation state 373, the per-user conversation state 373 also includes a corresponding timestamp indicating the date and time (or pair of timestamps to indicate a range of dates/times) at which to reminder the participant to pay attention to the conversation or a portion thereof, optionally a user ID identifying the user who initiated the reminder (in some embodiments, reminders can be sent by a user not only to themselves, but to other participant(s) in the conversation), and optionally a content range indicator for specifying a portion of the conversation that is the subject of the reminder.

Another optional flag 376 in the per-user conversation state 373 for a respective participant is a ping flag A ping flag is included in the per-user conversation state 373 when another participant has sent a ping (which is a form of notification, or instant message) to the participant (typically an online participant), or when the participant has sent a ping to another participant. The ping flag, when present, indicates to the client application that a ping notification (e.g., a pop-up box) is to be displayed.

Much of the information (e.g., conversation state 373) in each participant record 362 is private to that participant and is not shared with other participants of the conversation or other users in the conversation system. In some embodiments, the cursor position (see 379, FIG. 3B) of each participant who is actively editing a content unit or entering new text in a conversation is published to and visible to other participants of the conversation, unless a respective participant has elected to suppress publication of their cursor position, in which case that aspect of the participant's conversation state 373 is not considered to be private to the participant. When there are a plurality of active participants who are editing the same conversation, cursor position information for each of the active participants is transmitted to the clients of the active participants (via their hosting conversation servers). At the client of a respective participant, a plurality of cursor positions (corresponding to a plurality of different participants) are concurrently displayed when the cursor positions are sufficiently close to each other to enable concurrent display.

As described above, in some embodiments, for each respective conversation record 310, the server 140 maintains for each respective participant 362 a conversation state 373 of the respective conversation in regard to the respective participant. The server 130 provides to the respective participant (e.g., to a client that is displaying the conversation to the participant) the state of the respective conversation in regard to the respective participant. In some embodiments, this includes providing to the participant (e.g., to the client being used by the participant) the read status of the content units of the respective conversation in regard to the participant (i.e., indicating which content units have already been read or viewed (in their current state) by the participant, and which have not). In some embodiments, providing the conversation state 373 of the respective conversation in regard to the respective participant includes providing labels 378, specified by the respective participant for the respective conversation.

In some embodiments, providing the state 373 of the respective conversation in regard to the respective participant includes providing, in accordance with instructions from the participant, metadata (e.g., ignore flag 377) to ignore the respective conversation. This provides a participant with an option to manage conversations in accordance with a rule, in effect to archive conversations, and to reduce congestion in a conversation viewer. For example, when a participant marks a conversation with a system defined label of "ignore" or "mute," the ignore status flag 377 for the participant (for the marked conversation) is set, and the conversation is thereafter treated (on behalf of this particular participant) much like an archived message or conversation. Other participants of the conversation may continue to see the conversation in their list of active conversations if they have not marked the conversation with the "ignore" label.

In some embodiments, the per-user conversation state 373 for each participant of each hosted conversation is stored in the conversation database 262, as shown in FIG. 3A. In other embodiments, the per-user conversation state 373 for each participant of each hosted conversation is stored in the user database 400, discussed below. In yet other embodiments, per-user conversation state 373 information (for each participant of each hosted conversation) is stored in a separate database or server (sometimes called the "user supplement" database or server) that is separate from the conversation database 262 and user database 400. Optionally, pointers to per-user conversation state 373 information (e.g., record) in the user supplement database may be stored in the user database 400 and conversation database 262. Alternately, such pointers are not stored, and the per-user conversation state 373 for a particular user of a respective conversation is retrieved, typically for transmission to a client participating in the conversation, from the user supplement database on an as-needed basis and is updated in accordance with operations (e.g., reading content, entering end content, editing content, etc.) performed by the participant.

As described in more detail below, in some embodiments, the conversation server 130 stores, for each respective subscriber, a contact list (416, described in FIG. 4) associated with the respective subscriber. In some embodiments, the contact list is stored in a user database 270 (FIG. 2) or 400 (FIG. 4).

When a conversation is sent to a client for display to a user, the client receives only a portion of the conversation record 310 (FIG. 3A) for the conversation. For example, in some embodiments, the portion of the conversation record 310 sent to and stored at the client excludes the conversation log 324, and the conversation state 373 of other participants (except, the cursor position of other currently active participants in the conversation who have not blocked the transmission of their cursor position). In some embodiments, the conversation log 324 is sent to a client 110 only when the participant at that client has requested playback of the conversation, or a user-specified portion of the conversation, or has requested to view the state of the conversation at a particular time or point in the past.

Figure 3C:
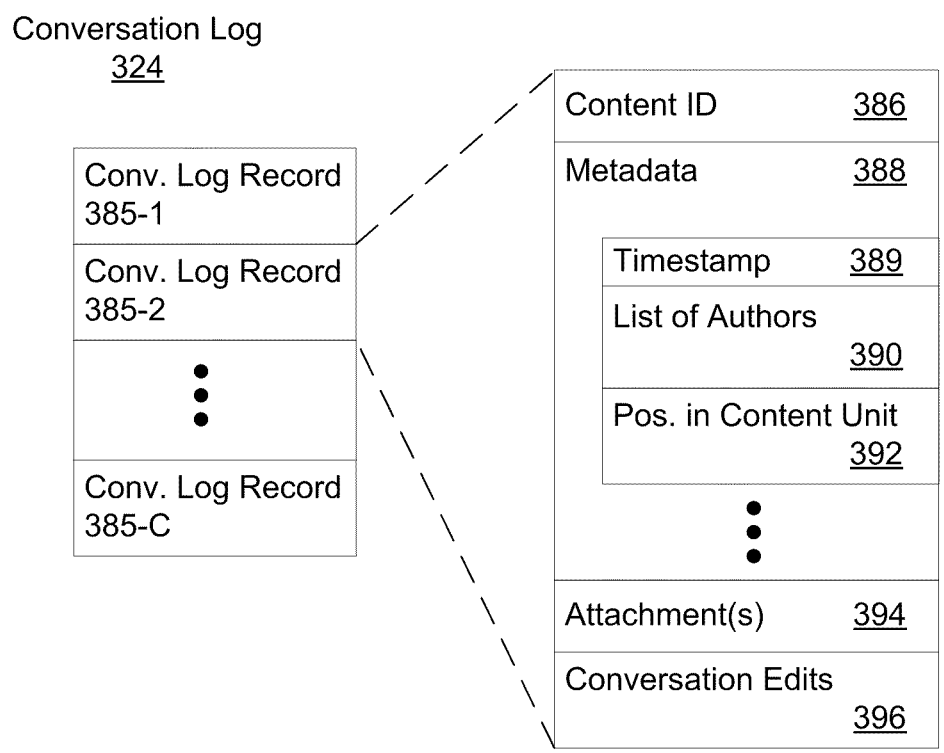

FIG. 3C is a block diagram illustrating data structures for the conversation log 324, according to some embodiments. The conversation log 324 includes an time ordered sequence of log records 385-1 to 385-C (sometimes called log entries). A respective log record 385 includes a content ID 386, identifying the content unit (if any) updated by the conversation edits recorded in the log record 385, metadata 388 relevant to the conversation edits recorded in the log record, references 394 (e.g., one or more pointers or file names) to any attachments added to the conversation by the conversation edits recorded in the log record, and a list of the conversation edits or changes 396 recorded in the log record. The metadata 388 includes a timestamp 389 and/or sequence number that uniquely identifies the order of the conversation edits in the log record, relative to the conversation edits in other log records for the same conversation. The metadata 388 also identifies a list of authors (also called contributors) 390 of the conversation edits in the log record, and the starting position 392 of the conversation edits recorded in the log record 385. While the authors list 390 will contain only one author for most log records 385, when multiple authors make edits or contribute content to a content unit during a short period of time, or during overlapping time periods, a single corresponding log record 385 includes a list 390 of all of the authors who contributed to the change in the content unit recorded by that log record 385. In some embodiments, the starting position 392 is incorporated into the conversation edits 396, as an offset or position setting for the first edit or update operation of the conversation edits 396, and in those embodiments the log records do not have a separate starting position 392 field.

Figure 4:
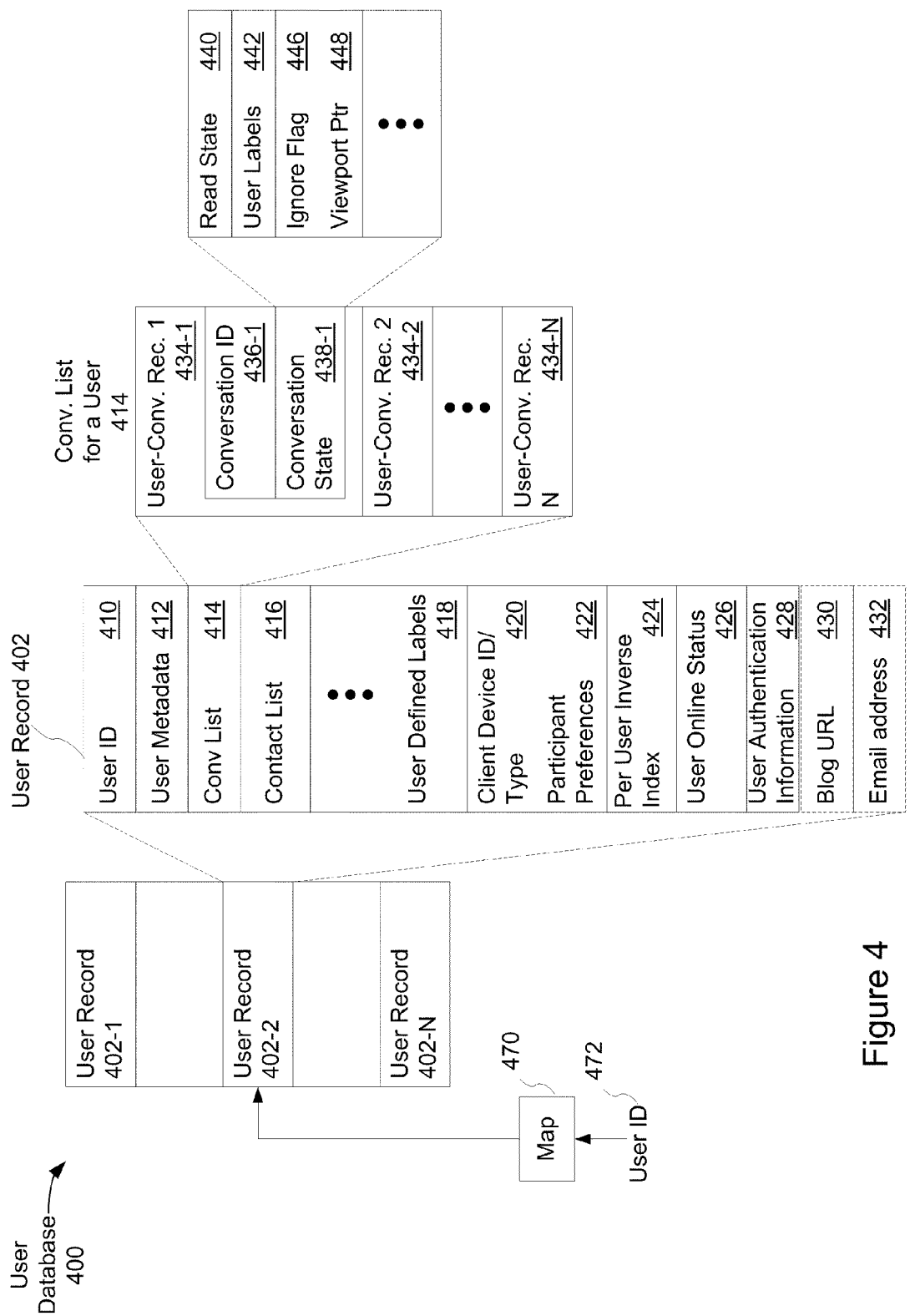
FIG. 4 is a block diagram illustrating a data structure for a user database, according to certain embodiments of the invention.

FIG. 4 is a block diagram illustrating a data structure for a user database 400, according to certain embodiments of the invention. The database 400 includes a plurality of user records 402. In some embodiments, each user record 402 includes:

- a user identifier 410 for a subscriber of the hosted conversation system;
- user metadata 412, containing information about or for the user;
- a list of conversations 414 in which the user is a participant;
- the user's contact list 416 (typically a list of contacts 416 that corresponds to and is personal to user);
- optionally, labels 418 defined by the user for labeling or classifying conversations;
- optionally, a client device identifier and/or type 420 of a client device being used by the user to communicate with the conversation server, or alternately, the identifier and type of client devices that the user has used in conjunction with the conversation server in the past; in some embodiments, the type of the client (e.g., desktop, cell phone, etc.) may be used to determine what content from conversations is sent to the user;
- optionally, preferences 422 of the user when participating in a conversation 422;
- optionally, an inverse index 424 associated with the user;
- a current online status 426 of the user (e.g., offline, online, busy, away, etc.);
- authentication information 428 for the user (e.g., username, password, and optionally other values for authentication of the user);
- optionally, other data relating to the user, such as one or more blog URLs 430, email addresses 432, etc.

The conversation list 414 associated with a user includes a plurality of user-conversation records 434, each record relating to a conversation in which the user is a participant. Each user-conversation record 434 includes:

- a conversation identifier 436 that identifies the respective conversation, and
- per-user conversation state information 438, which may be the same as (or a pointer to) the conversation state 373 in the participant record 362 of a conversation record 310. As discussed above, in some embodiments, per-user conversation state information is stored in a separate database or server (sometimes called the user supplement database or server), in which case the user-conversation record 434 includes a conversation identifier 436, but not the per-user conversation state information 438.

As noted above, in some embodiments the system includes a separate per-user inverse index 424 for each user of the system; each such index 424 is an index that maps the terms, labels, tags, etc. of the conversations in which a user is participant to the conversations (and optionally, to the content units with the conversations, or locations within the conversations) containing those terms, labels, tags, etc. These per-user indices enable fast indexing and fast searching of the conversations in which a user is a participant. In some embodiments, additional indices (sometimes called "big wave" indices) are used to provide fast indexing and access to "big wave" conversations having large numbers (e.g., more than a threshold number, such as 500 or 100) of participants. In these embodiments, the content of "big wave" conversations is not indexed in the per-user inverse indices 424, and is instead indexed in one or more "big wave" indices. Similarly, in some embodiments in which groups of users participate in conversations as groups, additional per-group indices are used to index those conversations and to provide fast searching of those conversations; and the conversations (if any) in which a respective user participates only as a group member are not included in the user's per-user inverse index 424. Thus, when a user performs a search for conversations satisfying a user-specified query, multiple indices may be searched, in which case the search results from the multiple indices are merged prior to returning the search results to the requesting user.

In some embodiments, server 130 provides the same content of a conversation to all participants of the conversation, and provides each online participant with online presence information for the other participants in the same conversation. In some embodiments, the server allows a participant of a conversation to disable publication of their online presence information to other participants in the conversation. In some embodiments, the server allows a participant of a conversation to selectively enable publication of their online presence information to other participants in the conversation (e.g., allowing publication of the participant's online presence only to users designated by the participant; or alternately, disabling publication of the participant's online presence to users specifically designated by the participant).

In some embodiments, server 130 provides the same content to each participant, formats content of the conversation to be compatible with one or more content types that a client device 110 associated with a respective participant has been configured to receive, and transmits the formatted content to the client device.

In some embodiments, when delivering the content of a conversation to certain clients (e.g., a cell phone or PDA), conversation server 130 formats the content by compressing multimedia data associated with the content (e.g., to reduce bandwidth requirements). In some embodiments, the server provides a subset of multimedia data associated with the content (e.g., a thumbnail image, or short audio/video clip) to the client. In some embodiments, the conversation server removes multimedia data associated with the content (e.g., strips out multimedia and just provides text) that is delivered to the client.

In some embodiments, the conversation server 130 authenticates a user using authentication information 428 prior to providing content from conversations to the user.

In some embodiments, the conversation server 130 sends content from conversations in which a respective user is a participant to a weblog (e.g., weblog server 226 or weblog client 228), specified (e.g., by Blog URL 430) in the user record 402 for that user. When a respective participant in a conversation is an automated client, content of the conversation is sent to the automated client. The automated client may be a weblog, an email server or account, or a service provider such as a translation service, spelling checking service, or the like.

FIGS. 5A-5E are flowcharts representing methods for hosting conversations at a server, according to certain embodiments of the invention. These methods are governed by instructions that are stored in a computer readable storage medium and that are executed by one or more processors of one or more servers. Each of the operations shown in FIGS. 5A-5E may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

Figure 5A:
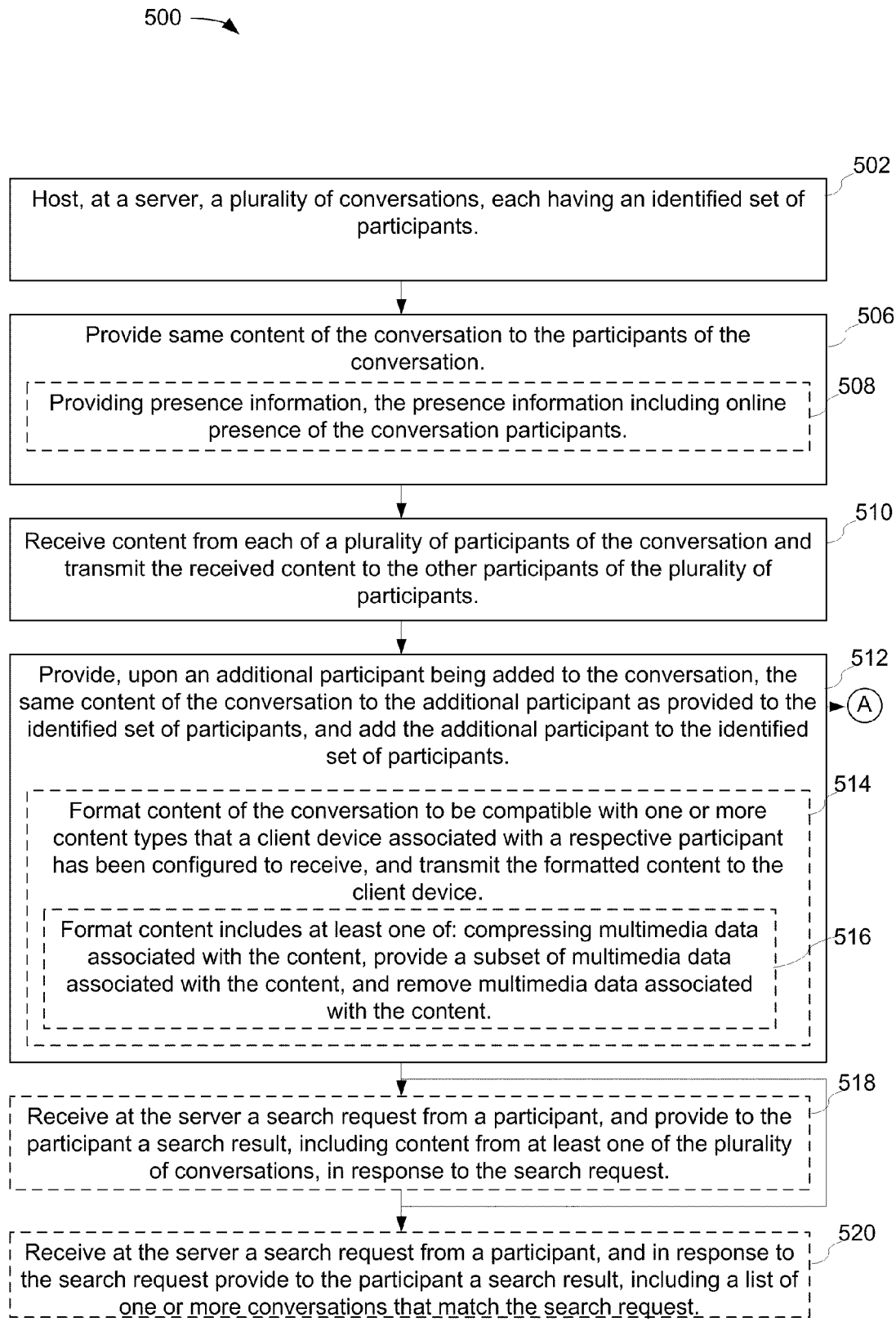
FIGS. 5A-5E are flowcharts representing a method for hosting conversations at a server, according to certain embodiments of the invention.

FIG. 5A shows a method 500 for hosting conversations at a server. A server hosts (502) a plurality of conversations, each having an identified set of participants. The server is typically one of a plurality of servers that hosts conversations in a hosted conversation system.

The server provides (506) the same content from a conversation to all the participants of the conversation. In some embodiments, the server also provides (508) online presence information of each of the plurality of participants in the conversation to other participants in the conversation. The server receives (510) content from each of a plurality of participants of the conversation and transmits the received content to the other participants of the plurality of participants.

The server provides (512), upon an additional participant being added to the conversation, the same content of the conversation to the additional participant as provided to the identified set of participants, and adds the additional participant to the identified set of participants. As noted above, when the additional participant is using a client capable of receiving the entire content of the conversation, the entire content of the conversation is sent to the client currently being used by the additional participant. In some embodiments, the "entire content of the conversation" includes all of the content that was added by previous participants in the conversation before the additional participant was added to the conversation as well as any automatically generated content (e.g., content generated by the server system) that was included in the conversation at the time the additional participant was added. As a result, a participant added to a conversation, even long after the conversation has begun, receives content contributed to the conversation before the participant was added to the conversation. It should be understood that protecting the privacy of personal data associated with participants in a conversation and/or content added by participants to the conversation is frequently a concern for the participants. Accordingly, in some embodiments, such privacy concerns are addressed in any of a number of ways, including but not limited to one or more of: enabling participants to participate in "private conversations" (as described in greater detail above with reference to FIG. 3A); enabling participants to edit a draft message in "team draft mode" (as described in greater detail below with reference to FIG. 10); allowing participants to opt out of automatically sharing their content (e.g., by restricting access to content added by a respective participant so that it can only be accessed by other participants that have been specifically approved by the respective participant); and restricting the ability of participants to add additional participants to a respective conversation without the approval of one or more other participants on the respective conversation (e.g., requiring approval of half of the other participants or all of the other participants before adding a new participant to the respective conversation).

In some embodiments, the server formats (514) content of the conversation to be compatible with one or more content types that a client device associated with a respective participant has been configured to receive, and transmits the formatted content to the client device. In some embodiments, the server formats content from a conversation by performing at least one of: compressing multimedia data associated with the content, providing a subset of multimedia data associated with the content, and removing multimedia data associated with the content (e.g., removing video and audio data but leaving text content).

In some embodiments, the server receives (518) a search request (often called a query or search query) from a participant, and provides to the participant a search result, including content from at least one of the plurality of conversations, in response to the search request. Alternately, or in addition, in response to the received search request the server provides (520) to the participant a search result that includes a list of one or more conversations that match the search request. In some embodiments, the search request is processed by query engine 260 (FIG. 2), using an inverse index 264 of conversation content to identify conversations, or content within one or more conversations, that match the search request.

Figure 5B:
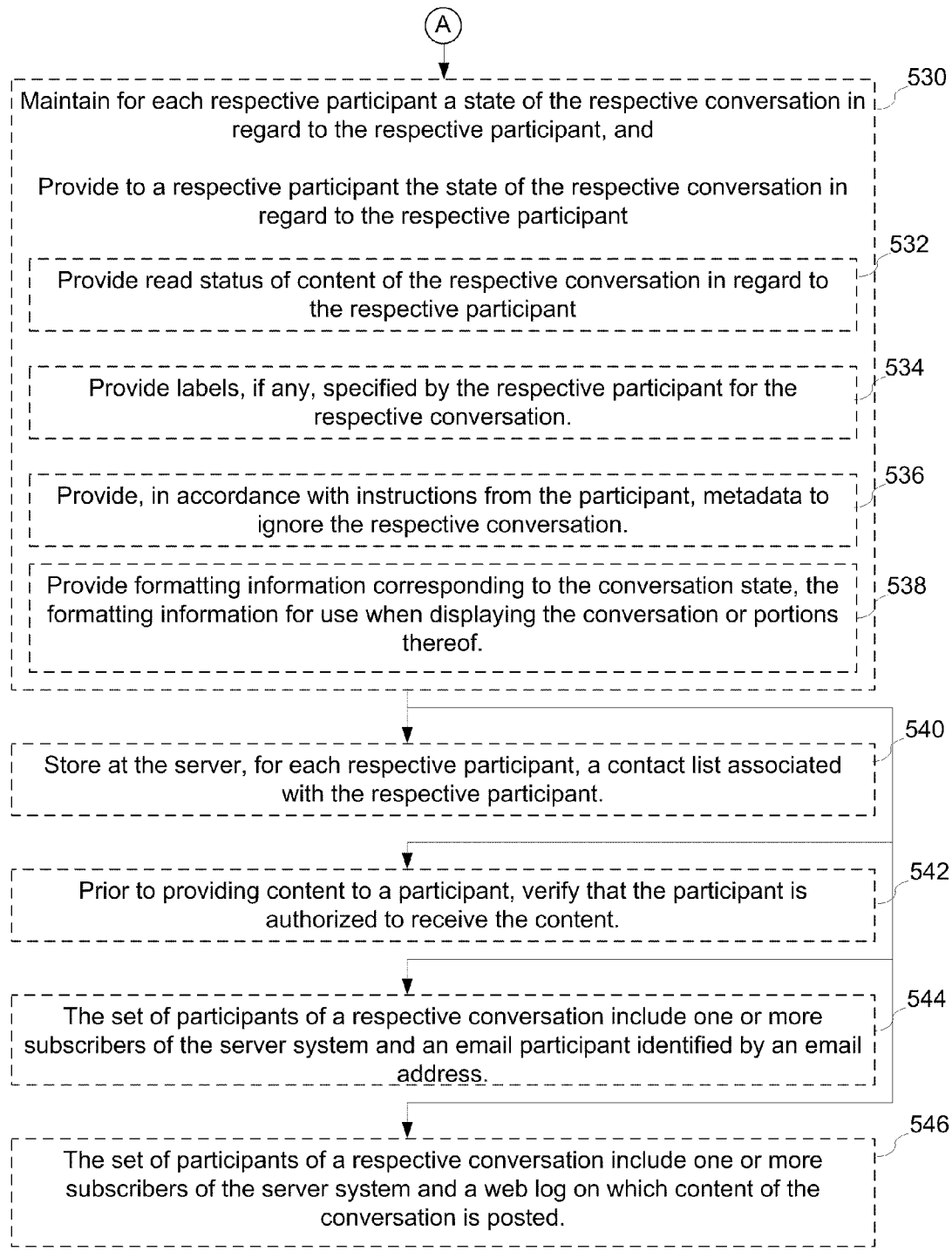

FIG. 5B shows a continuation of the method 500 of FIG. 5A. A server maintains (530) for each respective participant a state of the respective conversation in regard to the respective participant, and provides to the respective participant (e.g., to the client currently being used by the participant to view the conversation) the state of the respective conversation in regard to the respective participant. In some embodiments, this includes providing (532) to the participant (e.g., to the client being used by the participant) the read status of the content units of the respective conversation in regard to the participant (i.e., indicating which content units have already been read or viewed by the participant, and which have not). In some embodiments, providing (534) the state of the respective conversation in regard to the respective participant includes providing labels, if any, specified by the respective participant for the respective conversation.

In some embodiments, the metadata maintained for a conversation with respect to a particular participant includes (536) metadata to ignore the respective conversation, in accordance with instructions from the participant. For example, the ignore metadata may be provided to the search engine 260 (FIG. 2) of the conversation server. In some embodiments, the server provides (538) formatting information corresponding to the conversation state, the formatting information for use when displaying the conversation or portions thereof. In some embodiments, the formatting information includes one or more of: color (e.g., of text, background, borders), font, indenting, position (e.g., superscript or subscript), etc.

In some embodiments, the server stores (540), for each respective participant, a contact list associated with the respective participant.

In some embodiments, the server verifies (542) (using authentication information 428) that the participant is authorized to receive the content of a conversation, prior to providing content to a participant.

In some embodiments, the server maintains (544) a set of participants of a respective conversation, including one or more subscribers of the server system and an email participant identified by an email address.

In some embodiments, the server maintains (546) a set of participants of a respective conversation, including one or more subscribers of the conversation system hosted by the server and a weblog on which content of the conversation is posted.

Figure 5C:
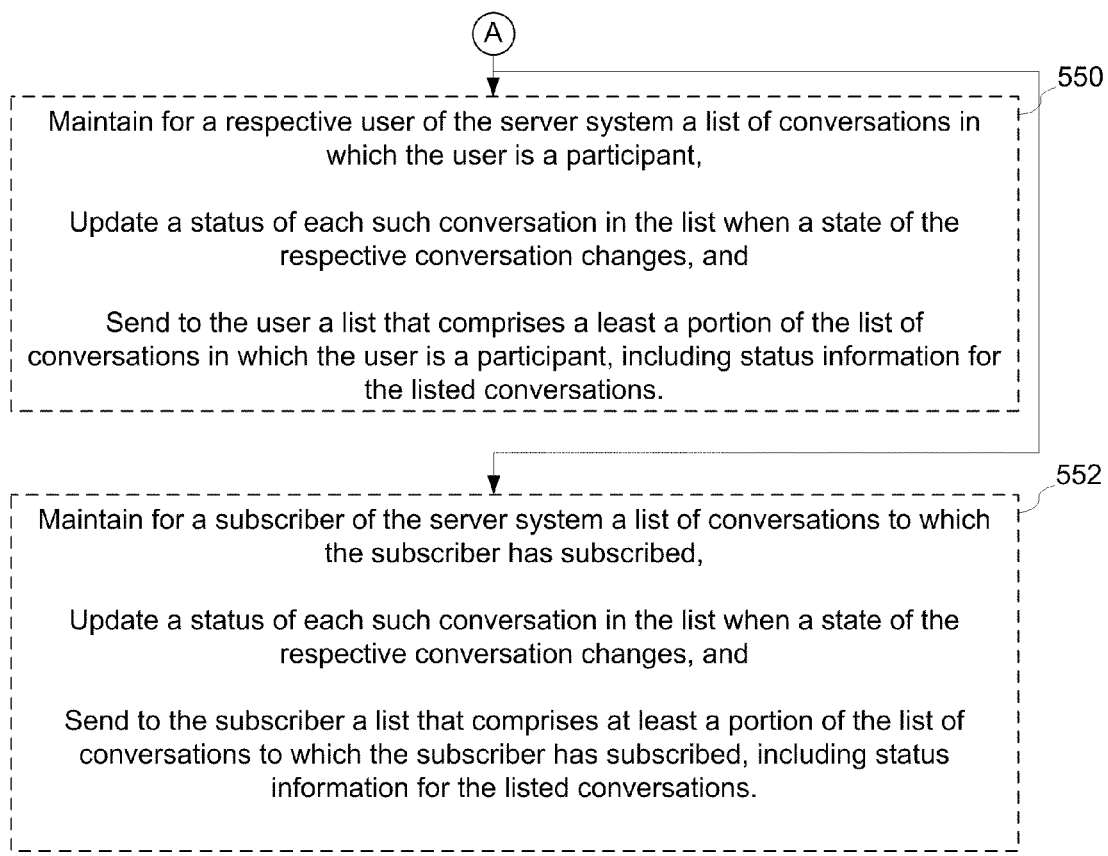

FIG. 5C shows a continuation of the method 500 of FIG. 5A. In some embodiments, the server maintains (550) for a respective user (of the conversation system hosted by a set of servers that includes the server) a list of conversations in which the user is a participant. The server updates a status of each such conversation in the list when a state of the respective conversation changes. Upon request from the user (e.g., from a client being used by the user) the server sends to the user a list comprising at least a portion of the list of conversations in which the user is a participant, the list including status information for the listed conversations. In some embodiments, each respective user for which the server maintains (552) a list of conversations is a subscriber of the hosted conversation system.

Figure 5D:
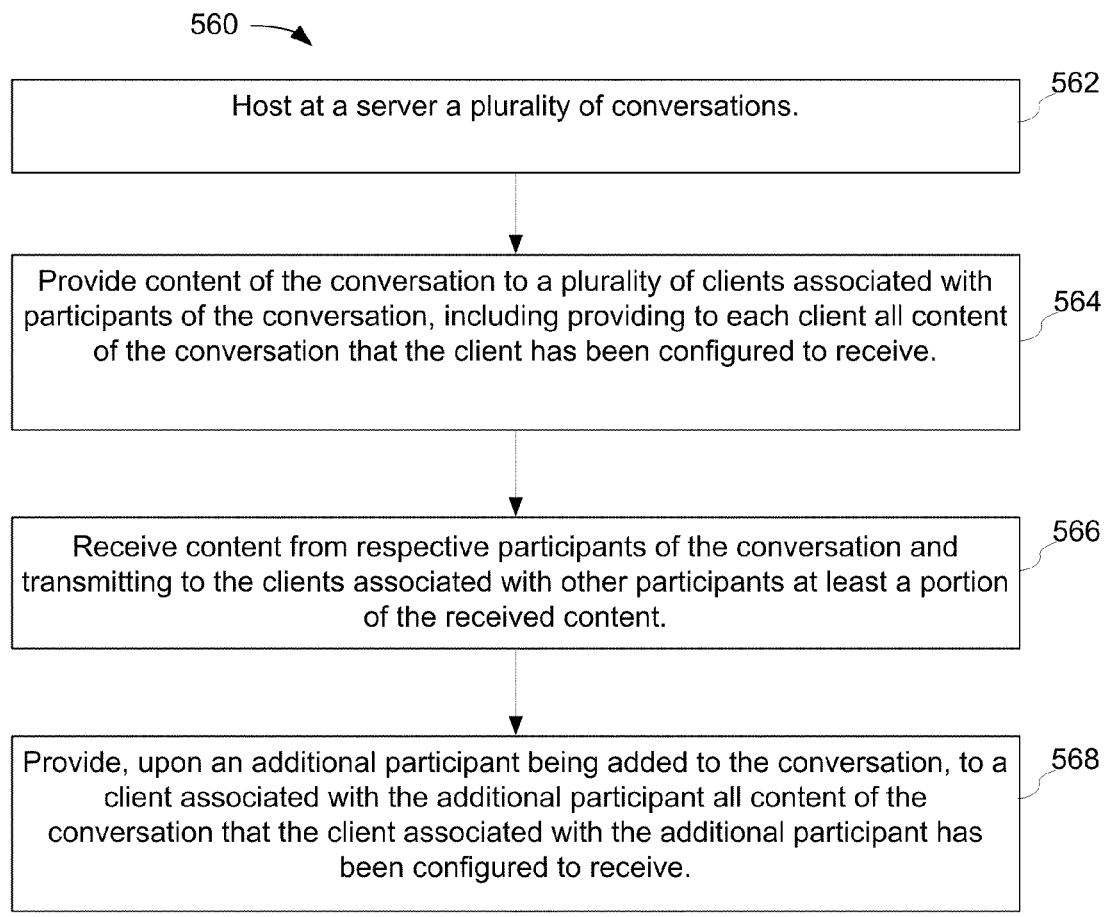

FIG. 5D shows a method 560 of hosting electronic messages. A server hosts (562) a plurality of conversations. The server provides (564) content of the conversation to a plurality of clients associated with participants of the conversation, including providing to each client all content of the conversation that the client has been configured to receive.

The server receives (566) content from respective participants of the conversation and transmits to the clients associated with other participants of the conversation at least a portion of the received content. The server also provides (568), upon an additional participant being added to the conversation, to a client associated with the additional participant all content of the conversation that the client associated with the additional participant has been configured to receive.

Figure 5E:
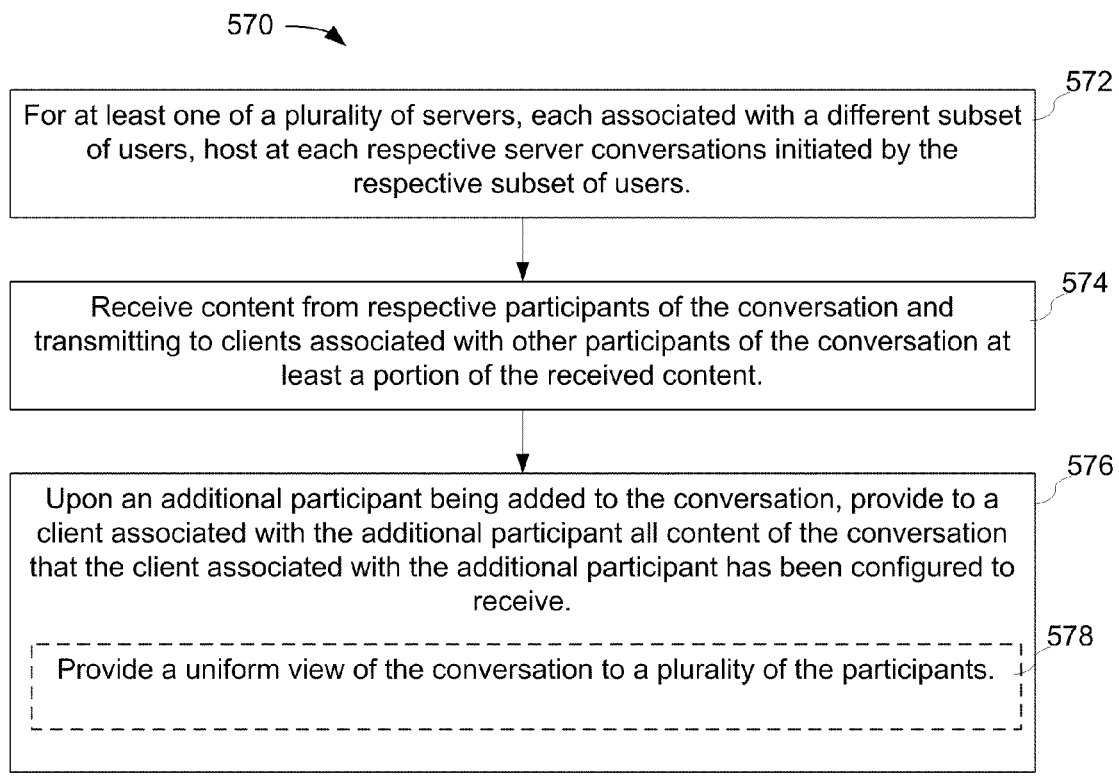

FIG. 5E shows a method 570 of hosting electronic messages. For at least one of a plurality of servers, each associated with a different subset of users, a server hosts (572) conversations initiated by the respective subset of users. The server receives (574) content from respective participants of the conversation and makes the content available to other participants of the conversation. For participants associated with other conversation servers, the content is transmitted to those other conversation servers. The content is transmitted to the participants when they log in and request the content of the conversation.

The server also provides (576), upon an additional participant being added to the conversation, all the content of the conversation to a client associated with the additional participant, or alternately, all content of the conversation that the client associated with the additional participant has been configured to receive. In some embodiments, the server provides (578) a uniform view of the conversation to a plurality of the participants.

Figure 6:
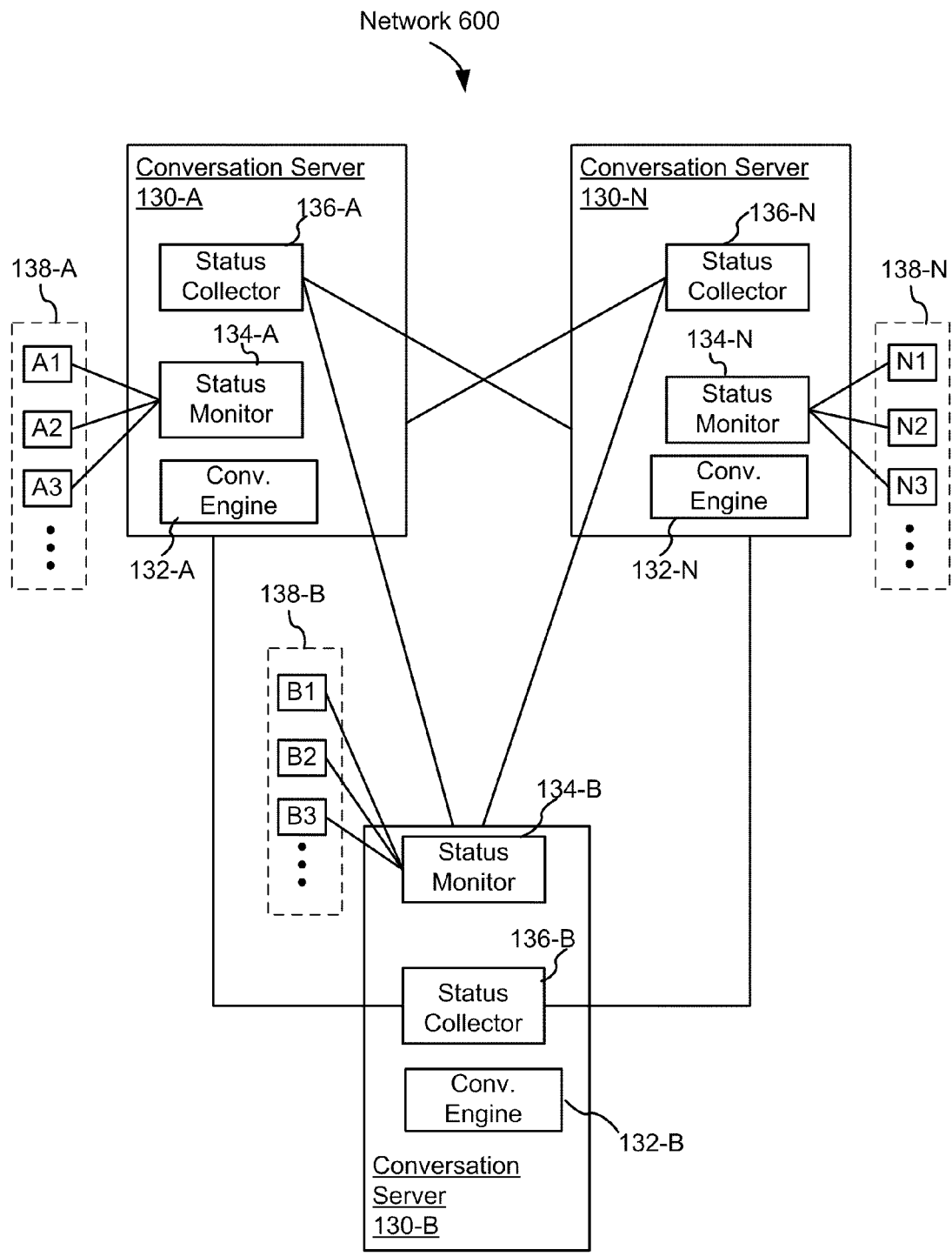
FIG. 6 is a block diagram of a plurality of linked conversation server systems, with mechanisms for obtaining and distributing user online presence information, according to certain embodiments of the invention.

FIG. 6 is a block diagram of a conversation system 600 having a plurality of linked conversation servers 130, according to certain embodiments of the invention. FIG. 6 illustrates a logical coupling of the conversation servers 130 to each other and to clients for monitoring and reporting the online status (presence) of the system's users. The network 600 includes conversation servers 130-A, 130-B, and 130-C. The conversation system 600 may include more or fewer conversation servers than shown in FIG. 6. Each conversation server 130 hosts conversations for a set of users 138. (For example, each conversation server 130 may host conversations initiated by hundreds or even thousands of users.) Conversation server 130-A is assigned users 138-A; conversation server 130-B is assigned users 138-B; and conversation server 130-N is assigned users 138-N. Each conversation server 130 includes a respective status monitor 134 (134-A, 134-B, 134-N) and a respective status collector 136 (136-A, 136-B, 136-N).

Whenever a user changes online status (e.g., goes from offline to online, by logging into the conversation system), the change in status is detected by a respective status monitor 134 (e.g., a status monitor in the conversation server 130 assigned to the user). The status monitor 134 at the conversation server to which the user is assigned receives a message or otherwise detects the change in online status of that user to "online" (or "active," "busy," or whatever status is appropriate). Furthermore, the status collector 136 at the conversation server gathers the online status of the contacts in that user's contact list 416. While some of the contacts in the user's contact list may be assigned to the same conversation server, other contacts in the user's contact list are assigned to other conversation servers.

The status collector 136 of the conversation server to which the user is assigned gathers the online status of the user's contacts, including those assigned to other conversation servers, and forwards at least a portion of the collected status information to the user (i.e., to the client device or system currently being used by the user). In some embodiments, the status collector broadcasts requests for status information of the user's contacts to the other conversation servers, and the conversation servers to which the contacts are assigned respond to the requests. In some other embodiments, the status collector determines the conversation servers to which the contacts are assigned and sends requests for status information to those conversation servers. In some embodiments, the assignments of users to conversation servers may be determined by reference to an index of all users, a copy of which may be stored in all of the conversation servers or a subset thereof.

For example, if a user A1 of users 138-A, assigned to conversation server 130-A, changes online status from offline to online, a client application at the client being used by the user A1 sends a message to the conversation system 600 announcing that user A1 is online. The status monitor 134-A at the conversation server 130-A receives the message and updates the status of the user A1 to online. The status monitors 134 of other conversation servers either do not receive this message, or ignore it because the user A1 is not assigned to those other conversation servers. The status collector 136-A at the conversation server 130-A obtains a list of the contacts for the user A1 (e.g., by accessing contact list 416 for user A1). Using that list of contacts, the status collector 136-A gathers status information from the conversation servers to which the contacts are assigned. Thus, if a contact is assigned to conversation server 130-A, then the status collector 136-A accesses the contact's status information stored at conversation server 130-A. If a contact is assigned to conversation server 130-B, then server 130-A communicates with conversation server 132-0 to get the status information. A similar procedure occurs if a respective contact is assigned to conversation server 130-C.

Figure 7:
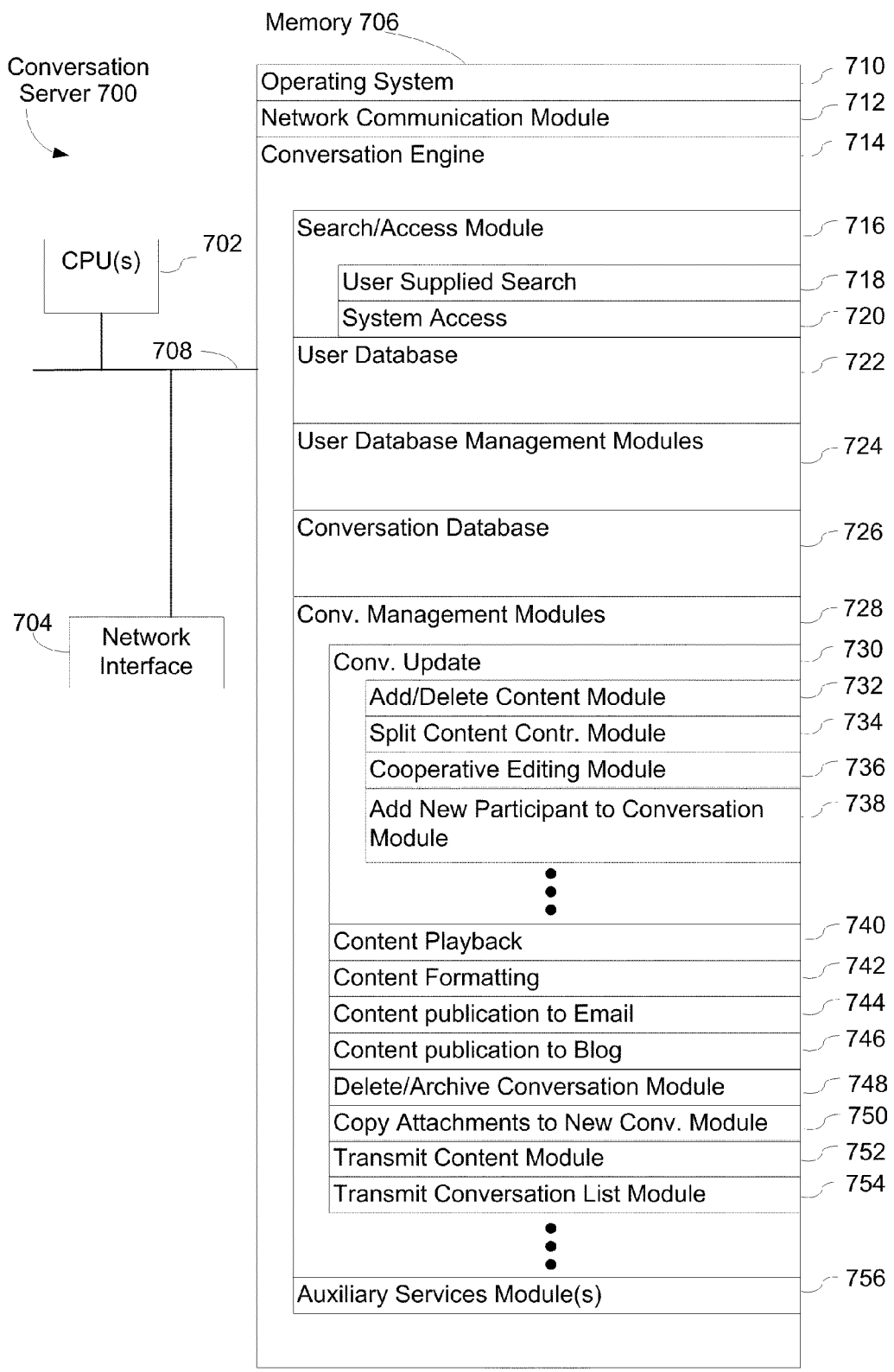
FIG. 7 is a block diagram of a conversation server for a hosted conversation system, according to certain embodiments of the invention.

FIG. 7 is a block diagram illustrating a conversation server 700 (also sometimes called a conversation system) in accordance with one embodiment of the present invention. The conversation server 700 includes one or more processing units (CPU's) 702, one or more network or other communications interfaces 704, memory 706, and one or more communication buses 708 for interconnecting these components. The communication buses 708 may include circuitry (sometimes called a chipset) that interconnects and controls communications between system components. The conversation server 700 optionally includes (but typically does not include) a user interface having a display device and a keyboard.

Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. Memory 706, or alternately the non-volatile memory device(s) within memory 706, includes a computer readable storage medium. In some embodiments, memory 706 or the computer readable storage medium of memory 706 stores the following programs, modules and data structures, or a subset thereof:

- an operating system 710 that includes procedures for handling various basic system services and for performing hardware dependent tasks;
- a network communication module 712 that is used for connecting the conversation server 700 to other computers via the one or more communication network interfaces 704 and one or more communication networks, such as the Internet, other wide area networks, local area networks, metropolitan area networks, and so on; and
- a conversation engine 714 that provides hosted conversation services on the server 700 for a plurality of users; in some embodiments, the conversation engine 714 corresponds to element 246 of FIG. 2.

The conversation engine 714 may include the following modules, or a subset thereof:

- a search/access module 716 (in some embodiments, this corresponds to element 260 of FIG. 2), for performing searches of the conversation database 726; the searches of the conversation database 726 may include user-specified searches 718 as well as server-specified searches 720 (e.g., a search for conversations in a user's inbox);
- a user database 722 (in some embodiments, this corresponds to element 270 of FIG. 2 and element 400 of FIG. 4), for storing information pertaining to users of the system;
- user database management modules 724, for managing the user database 722 (e.g., for creating new user records, and for updating existing user records);
- conversation database 726 (in some embodiments, this corresponds to element 262 of FIG. 2 and FIG. 3);
- conversation management modules 728, for managing the conversation database 726; and
- auxiliary services module(s) 250; as noted above, each particular auxiliary service provided in a hosted conversation system may be provided by modules within a conversation server 700, or by other servers.

In some embodiments, the conversation management modules 728 include the following modules, or a subset thereof:

- a set of conversation update modules 730, for updating a conversation with changes made by one or more participants, including one or more of: an add/delete content module 732, for adding or removing content from a conversation; a split content contribution module 734, for splitting a content contribution (326, FIG. 3A) in a conversation into two or more separate content contributions; a cooperative editing module 736, for enabling simultaneous editing of a conversation or a content contribution (unit of content) by a plurality of participants; and an add new participant to conversation module 738, for adding a new participant to a conversation;
- content playback module 740, for playing back edits to a conversation or document (or a user-specified portion of the conversation or document);
- content formatting module 742, for formatting content to match a configuration of a client; (the configuration of a client for a respective user may be specified by an element 420, FIG. 4, of the user record 402 for the respective user);
- content publication to email module 744, for publishing content of a conversation to an email address; the email address may be specified by an element 432, FIG. 4, of the user record 402 for the respective user;
- content publication to weblog ("blog") module 746 for publishing content of a conversation to a weblog; the URL or network location of the weblog may be specified by element 430, FIG. 4, of the user record 402 for the respective user)
- delete/archive conversation module 748, for deleting or archiving a conversation from a user's inbox or conversation viewer;
- copy attachments to new conversation module 750, for copying attachments from one conversation to another conversation, without copying other content of the conversation;
- transmit conversation module 752, for transmitting content of a conversation to a client or to another conversation server (e.g., for delivery to a user/client serviced by the other conversation server); and
- transmit conversation list module 754, for transmitting a list of conversations to a client or to another conversation server (e.g., for delivery to a user/client serviced by the other conversation server).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 706 may store a subset of the modules and data structures identified above. Furthermore, memory 706 may store additional modules and data structures not described above.

Although FIG. 7 shows a conversation server, FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a conversation server system and how features are allocated among them will vary from one implementation to another, and may depend in part on the amount of data traffic that the system must handle during peak usage periods as well as during average usage periods.

Figure 8:
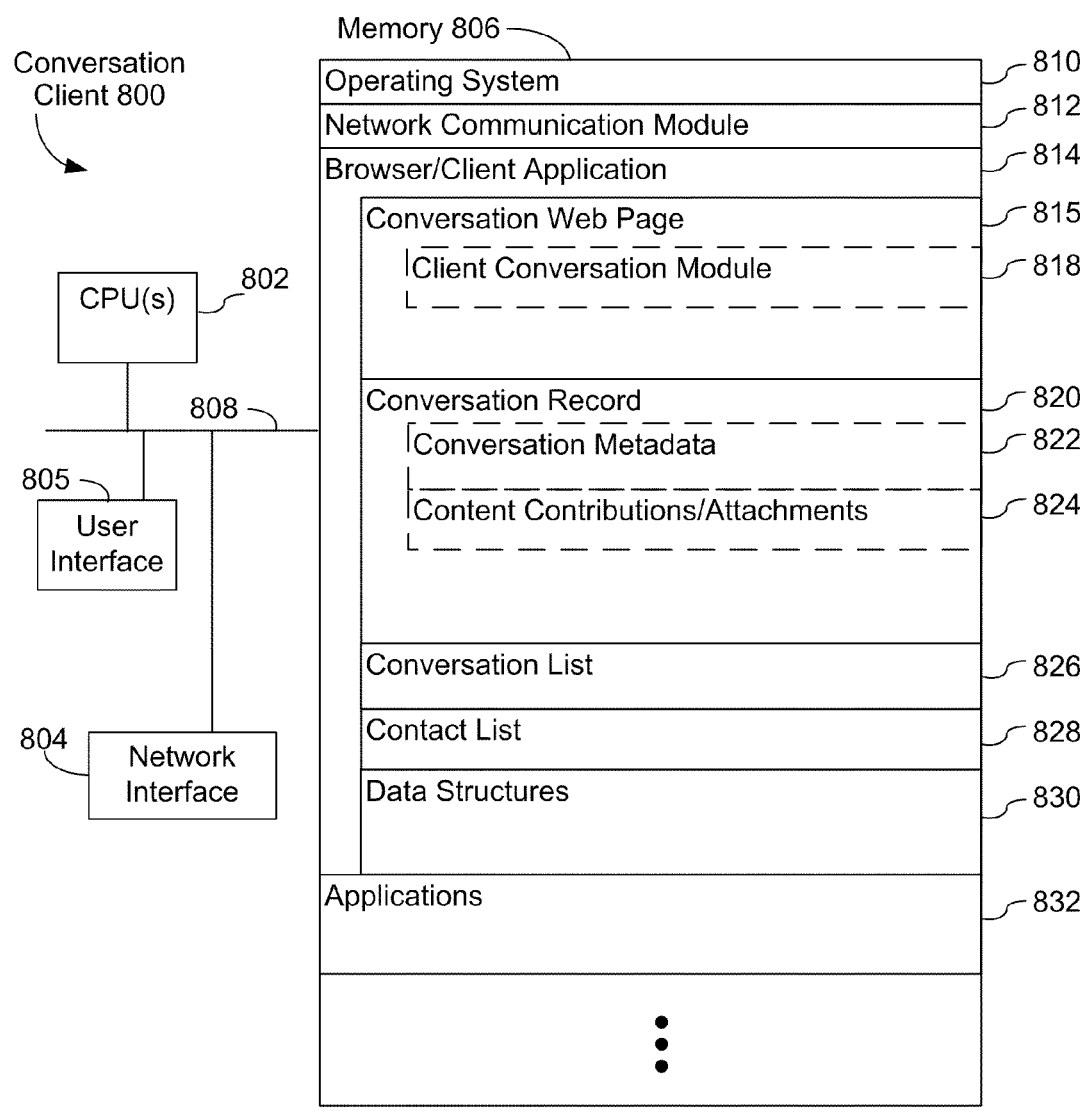
FIG. 8 is a block diagram of a client having a user who participates in one or more conversations in a hosted conversation system, according to certain embodiments of the invention.

FIG. 8 is a block diagram of a client having a user who participates in one or more conversations in a hosted conversation system, according to certain embodiments of the invention. The client 800 includes one or more processing units (CPU's) 802, one or more network or other communications interfaces 804, memory 806, and one or more communication buses 808 for interconnecting these components. The communication buses 808 may include circuitry (sometimes called a chipset) that interconnects and controls communications between system components. The client 800 typically includes a user interface 805. In some embodiments, the user interface includes a display device, a keyboard and a pointer device (not shown), while in other embodiments (e.g., a cell phone or personal digital assistant) the user interface includes a touch screen display.

Memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 may optionally include one or more storage devices remotely located from the CPU(s) 802. Memory 806, or alternately the non-volatile memory device(s) within memory 806, includes a computer readable storage medium. In some embodiments, memory 806 or the computer readable storage medium of memory 806 stores the following programs, modules and data structures, or a subset thereof:

- an operating system 810 that includes procedures for handling various basic system services and for performing hardware dependent tasks;
- a network communication module 812 that is used for connecting the client 800 to other computers via the one or more communication network interfaces 804 and one or more communication networks, such as the Internet, other wide area networks, local area networks, metropolitan area networks, and so on;
- a browser or other client application 814 for viewing and interacting with web pages and other content, including conversations in a hosted conversation system;
- a conversation web page 815, which is received from a conversation server (e.g., shown in FIG. 7) and is displayed using the browser or other client application 814;
- a conversation record 820, which contains the content of a conversation downloaded from a conversation server, some or all of which may be displayed in the conversation web page 815;
- a conversation list 826, which is a list of conversations downloaded from a conversation server (e.g., in response to a query from a user of the client or as part of a user interface displayed within the conversation web page 815);
- a contact list 828, or a portion of the contact list of the user of the client; the contact list may be maintained separately from or in conjunction with a conversation system;
- optionally, other data structures 830 (e.g., a list of labels defined by the user); and
- optionally, other applications 832 for execution by the client 800.

In some embodiments, the conversation web page 815 includes a client conversation module 818 or other client assistant that is embedded in the web page 815. The client conversation module 818 comprises executable instructions that are executed by the client 800; for example, the client conversation module 818 may include instructions that are executed by a virtual machine (e.g., a Java virtual machine) that is part of the browser 814. The conversation web page 815 includes a conversation user interface having icons, which when activated by a user, execute various tasks to enable a user to request a list of conversations, select a conversation for display, view various portions of a conversation, participate in the conversation (e.g., by adding content to or editing content of the conversation), start new conversations, download attachments, and so on. Icons in the conversation user interface may function as links to executable procedures and instructions in the client conversation module 818. The aforementioned conversation record 820 and conversation list 826 may, in some embodiments, be downloaded in response to instructions sent by a client conversation module 818, or other client assistant embedded in the web page 815, to a conversation server.

The conversation record 820 comprises a client version or subset of the conversation record 310, described above with respect to FIG. 3A, for a respective conversation. The client conversation record 820 includes conversation metadata 822 needed by the client (e.g., a list of participants and their online status) and content contributions 824 that are the content of the conversation. Depending on the implementation and the capabilities of the client 800, the conversation record 820 may optionally include the attachments, if any, of the conversation. Thus, attachments may be downloaded to some clients (e.g., desktop and laptop computers), but not to others (e.g., mobile phones and personal digital assistants). In some embodiments, the attachments of the conversation are not downloaded until they are requested by the user. Alternately, in some embodiments, thumbnail images and/or snippets (e.g., selected text, if any) of some or all the attachments are automatically downloaded to the client 800 along with the primary content of the conversation, and the full content of the attachments is downloaded to the client 800 only upon user request.

Each of the above identified modules corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, memory 806 or the computer readable storage medium of memory 806 may store a subset of the modules and data structures identified above. Furthermore, memory 806 or the computer readable storage medium of memory 806 may store additional modules and data structures not described above.

Figure 9A:
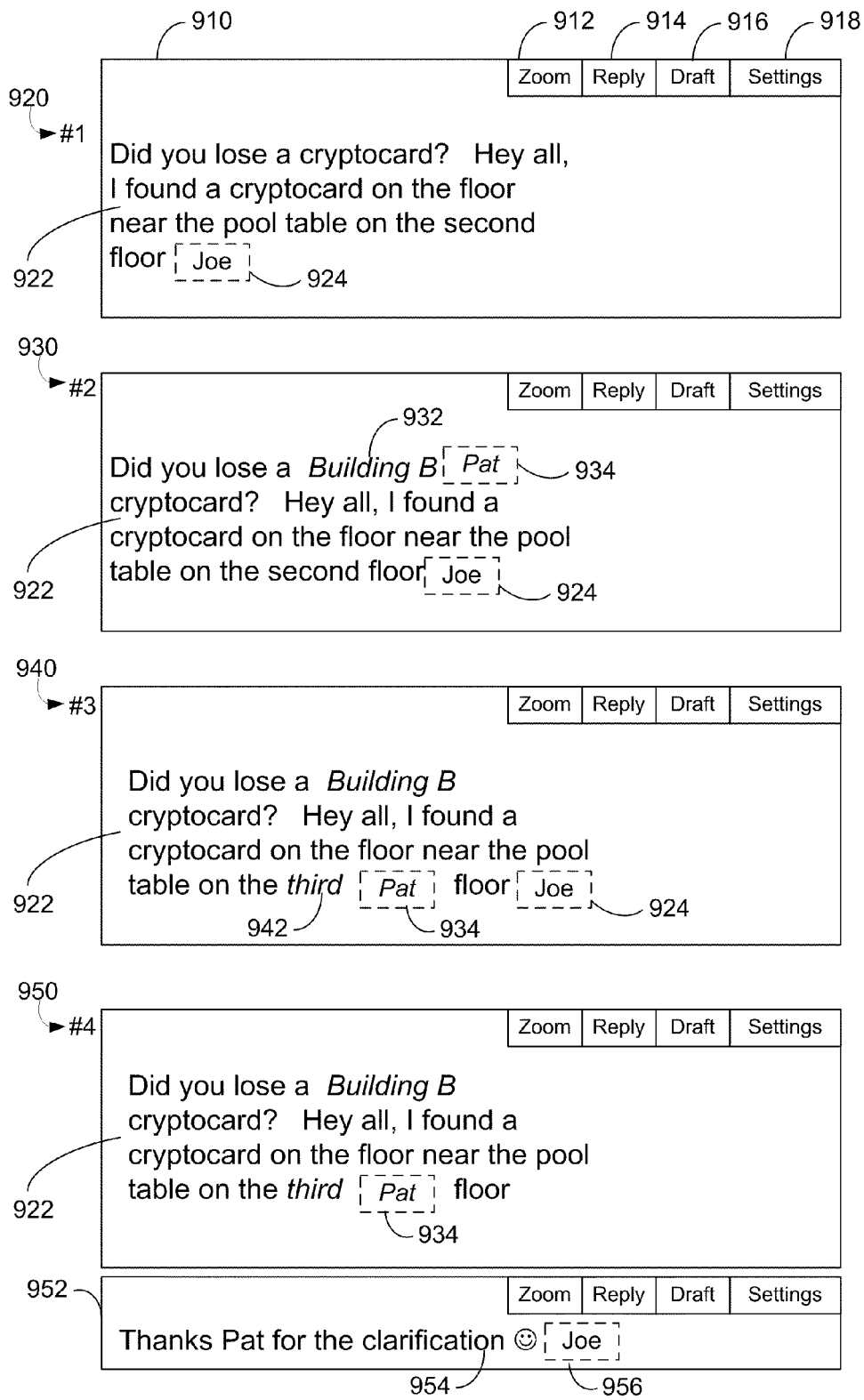
FIGS. 9A-9B illustrate a series of windows showing successive edits to a conversation by a plurality of participants of the conversation, and playback of those edits.
Figure 9B:
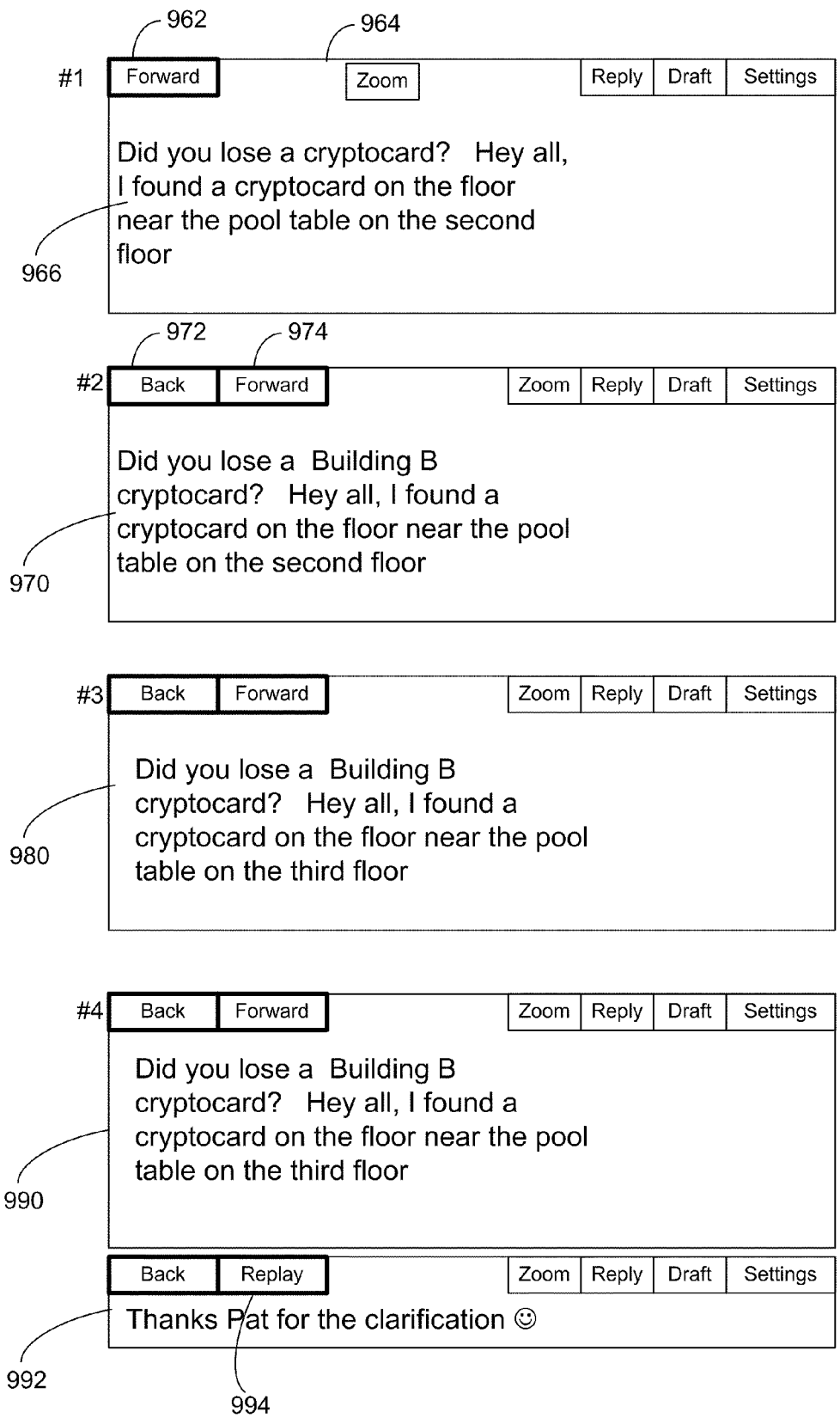

FIGS. 9A and 9B illustrates a series of windows showing edits to a conversation by a plurality of participants of the conversation, and playback of those edits.

FIG. 9A illustrates changes made to a conversation by a plurality of participants in the conversation. In the following example, there are at least two participants in the conversation, "Joe" and "Pat".

At a first time/step 920, a first conversation window 910 has a first unit of content 922 entered by a first participant (e.g., Joe), who is the initial author of content 922. In some embodiments, the conversation window 910 includes a zoom option 912 to zoom deeper into a conversation, a reply option 914 to reply to the content 922, a draft option 916 to create a draft message, or a setting option 918 to change conversation settings. A first caret 924 represents a point (sometimes herein called a cursor position) at which the first participant is typing or editing the content 922. As the first participant types, deletes, or moves around the content 922, the caret 924 moves, indicating the location in or portion of the content that the user is editing.

In some embodiments, the caret may be defined as an XML tag or other markup language tag or expression. In some embodiments, the caret content, style, etc. may be selected or defined by a participant, by a system administrator, etc.

At a second time/step 930, a second participant (Pat) provides a sequence of edits to the content 922. A second caret 934 represents a point at which the second participant (also called the second user) is typing or editing the content 922.

The second user adds the text "Building B" 932 to the content 922. The original content (by Joe) and the edits thereto (by Pat) are edits by distinct first and second participants in the conversation.

In some embodiments, a server (e.g., hosting the conversation) prepares for display the first caret at a position corresponding to the first edits by the first participant (Joe) of the conversation, and prepares for display a second caret at a position corresponding to the second edits by the second participant (Pat) of the conversation. The server provides the first and second edits and the first and second carets to the one or more servers for display.

In some embodiments, timestamps or sequence numbers (e.g., #1, #2, #3, and #4, as illustrated) may be associated with new content or edits to existing content. In some embodiments, if a timestamp is used, the timestamps use a consistent time base such as the time base of the hosting server.

At a third time/step 940, the second user again edits the content 922, by deleting the word "second" and replacing it with the word "third" 942. The second caret 934 is now beside the word "third", indicating the location where the second user is editing.

At a fourth time/step 950, first user Joe creates a new message, in a new message window 952 within the conversation window 910 and below the first message window (which contains content 922 of the first message), and adds new content 954 to the new message window. Caret 956 represents a new point at which the first user (Joe) is typing or editing the content 954 in the new message window 952.

In some embodiments, as a new content (e.g., content 922) or a sequence of edits (e.g., edits 932, 942) are received, the conversation is updated with the revised content unit. In some embodiments, the updated conversation is provided to the one or more servers hosting conversations for the participants (e.g., Joe, Pat, etc.) in the conversation.

In some embodiments, a server hosting the conversation checks for conflicts between the first edits and the second edits, and if a conflict occurs, the server notifies a participant associated with the conflict. For example, if participant Pat attempts to edit a piece of text that Joe is currently editing, such that the edits conflict with each other (e.g., Pat deletes a word as Joe is typing it, or Joe deletes a paragraph within which Pat is editing), a conflict occurs and one or both of the participants are notified. In some embodiments, conflicts are automatically resolved using a predefined concurrency control procedure, described in more detail below.

FIG. 9B illustrates playback of edits to the conversation illustrated in FIG. 9A. In some embodiments, the edits are played back in chronological order, e.g., according to timestamps associated with the edits. In some other embodiments, the edits are played back according to sequence numbers associated with the edits. A participant of the conversation may view changes to conversation using the playback mechanism.

In some embodiments, the conversation is played back showing changes within a user-specified portion (e.g., a block of text, a paragraph, a single unit of conversation (blip), etc.) of the conversation in a chronological order. In some embodiments, this user-specified portion of the conversation is played back without viewing changes to other portions of the conversation. In one example, the user-specified portion is a single content unit of the conversation.

In a first playback time/step, content 966 is displayed in a window 964. A forward option 962 is displayed allowing a viewer to go forward in the conversation playback.

In a second playback time/step, obtained by selecting the forward option 962 in window 964, content 970 shows edits by second participant (Pat) to the conversation, adding the words "Building B." A back option 972 is displayed, which allows a participant to move backward in the conversation playback, and the forward option 962 continues to be displayed.

In a third playback time/step, obtained by selecting the forward option 962 in window 964 while viewing the second playback time/step, content 980 shows further edits by second participant (Pat) to the conversation, replacing the word "second" with "third."

In a fourth playback time/step, obtained by selecting the forward option 962 in window 964 while viewing the third playback time/step, content 990 shows further edits (new window 992 with text) by first participant (Joe) to the conversation. A replay option 994 allows a participant to replay the sequence of updates to the conversation. In some embodiments, one or more playback options enable a participant to perform one or more of the following operations: playback recent edits (e.g., most recent in time or in number), edits by a particular participant, edits to a particular portion of the conversation, etc.

In some embodiments, a playback may only show changes by a particular participant of the conversation. This may allow the participant to review his/her changes, or to view the changes of another participant.

In some embodiment, edits in the sequence of edits include individual keystrokes of a sequence of keystrokes by a respective participant in the conversation. In some embodiments, a plurality of distinct edits in the sequence of edits are distinct keystrokes. In some embodiments, a plurality of distinct edits in the sequence of edits are distinct words. For example, edits 932 by participant Pat include a distinct word (Building) and a distinct letter (B), and edits 942 include a deletion operation (delete the word "second") and an addition operation (adding the word "third"). In some embodiments, as each of these distinct edits is received by the server hosting the conversation, the conversation is updated accordingly.

Figure 10:
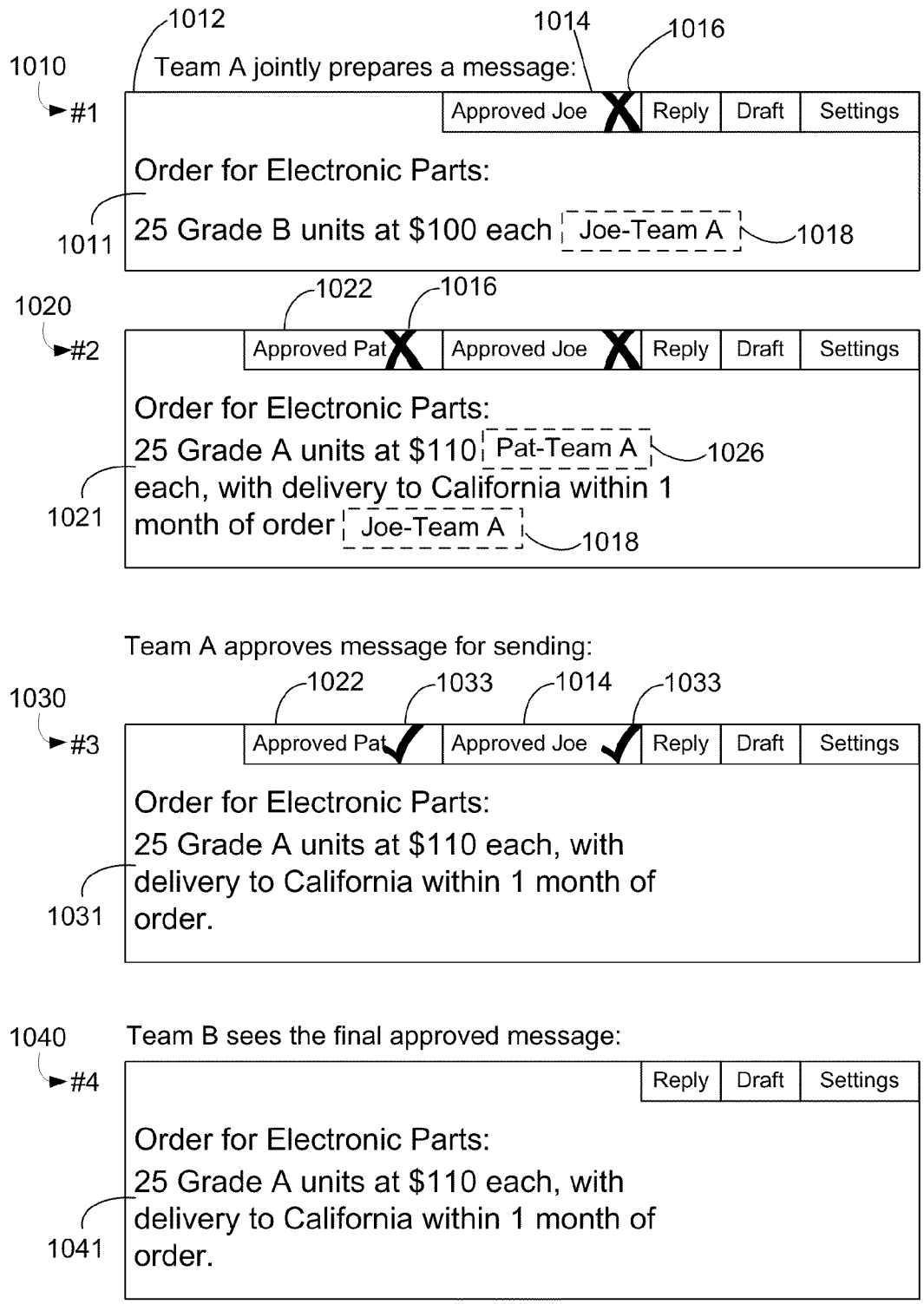
FIG. 10 illustrates a series of windows showing solo and team-based drafting of a conversation.

FIG. 10 illustrates participants preparing a message in a draft mode. While in draft mode, a participant makes edits, such as adding or deleting content in a conversation, and the edits are received by the server hosting the conversation, but are not sent to other participants in the conversation. Only when the participant exits the draft mode, e.g., by indicating that he/she is finished making edits, are the participant's edits released (i.e., sent to the clients of the other participants) by the server so that other participants can view them. The author (i.e., a participant working in draft mode) can prepare content, knowing that intermediate changes or thoughts will not be visible to other participants until the author is ready.

In some embodiments, when one participant is editing a content unit (of a conversation) in draft mode, editing of the content unit by other participants is disabled. Editing of other content units of the same conversation by other participants is not disabled.

In some embodiments, a "team draft mode" allows a plurality of participants (e.g., members of Team A) to work together in preparing or editing content and to see each other's edits, while preventing non-team participants from seeing the content or edits until the team draft mode is exited. Using the team draft mode protects the privacy of team members as they work together to prepare content for publication to other participants in the conversation.

A number of different mechanisms may be used to exit the team draft mode, or to release content prepared by a team of participants. For example, the team draft mode may be exited (or content prepared by a respective team may be released for publication to the other conversation participants), when team members agree that the edits should be published. In some embodiments, in order to exit the team draft mode, all team members must agree to publish edits or content, while in some other embodiments a majority of team member must agree to publish edits or content, and in yet other embodiments, one or more senior team members determine when to publish edits or content.

In the team draft mode, as a respective participant of the conversation makes edits to the conversation, the updated conversation is provided to a server associated with a team member. In some embodiments, the edits to the conversation are provided to a server associated with a non-team member, but display of the edits is delayed. In some embodiments, the edits to the conversation are not provided to a server associated with a non-team member until the draft mode is ended.

Further, in the 'team' draft mode, edits to the conversation from the participant (author) and one or more team members are received, the conversation is updated, and the updated conversation is provided to the one or more servers associated with the respective participant and the other team members.

In a first time/step 1010, a first author/participant (e.g., Joe, who is a member of Team A) prepares a message in window 1012. An approval option 1014 (e.g., using a check mark for approved and a cross 1016 for not approved) shows that the first author has not yet approved the message. When the first participant approves the message, this may be represented as a check mark 1033 in option 1014. The first author enters content 1011, and a caret 1018 indicates the first author's current text entry or editing position in the content. In some modes of operation, as the first author enters the content 1011, the content is made visible to members of the same team as the first user.

In a second time/step 1020, a second participant (Pat, who is also a member of Team A) edits the content 1011 (in this example, changing "$100" to "$110") to produce updated content 1021. Second caret 1026 shows the text entry or edit position of the second participant in the content. An approval option 1022 associated with the second participant is displayed at the top of the window 1012, and functions like the approval option 1014 associated with the first participant, as described above. As the second participant edits the content, the updated content 1021 is made visible to members of the same team.

In a third time/step 1030, the first (Joe) and second (Pat) participants approve the message for publication. This is indicated by check marks 1033 associated with approval options 1014 (for the first participant Joe) and 1022 (for the second participant Pat). The approved content (1031) is then published to other participants in the conversation.

In a fourth time/step 1040, the edits made by first and second participants are published so that conversation participants (e.g., members of Team B) outside of Team A can now view the published content 1041.

In the example shown in FIG. 10, all the team-based drafting and editing takes place in one message window 1012 for one content unit. In other embodiments, solo or team-based drafting can occur in more than one window or content unit, and can include adding new messages or editing existing messages.

Figure 11A:
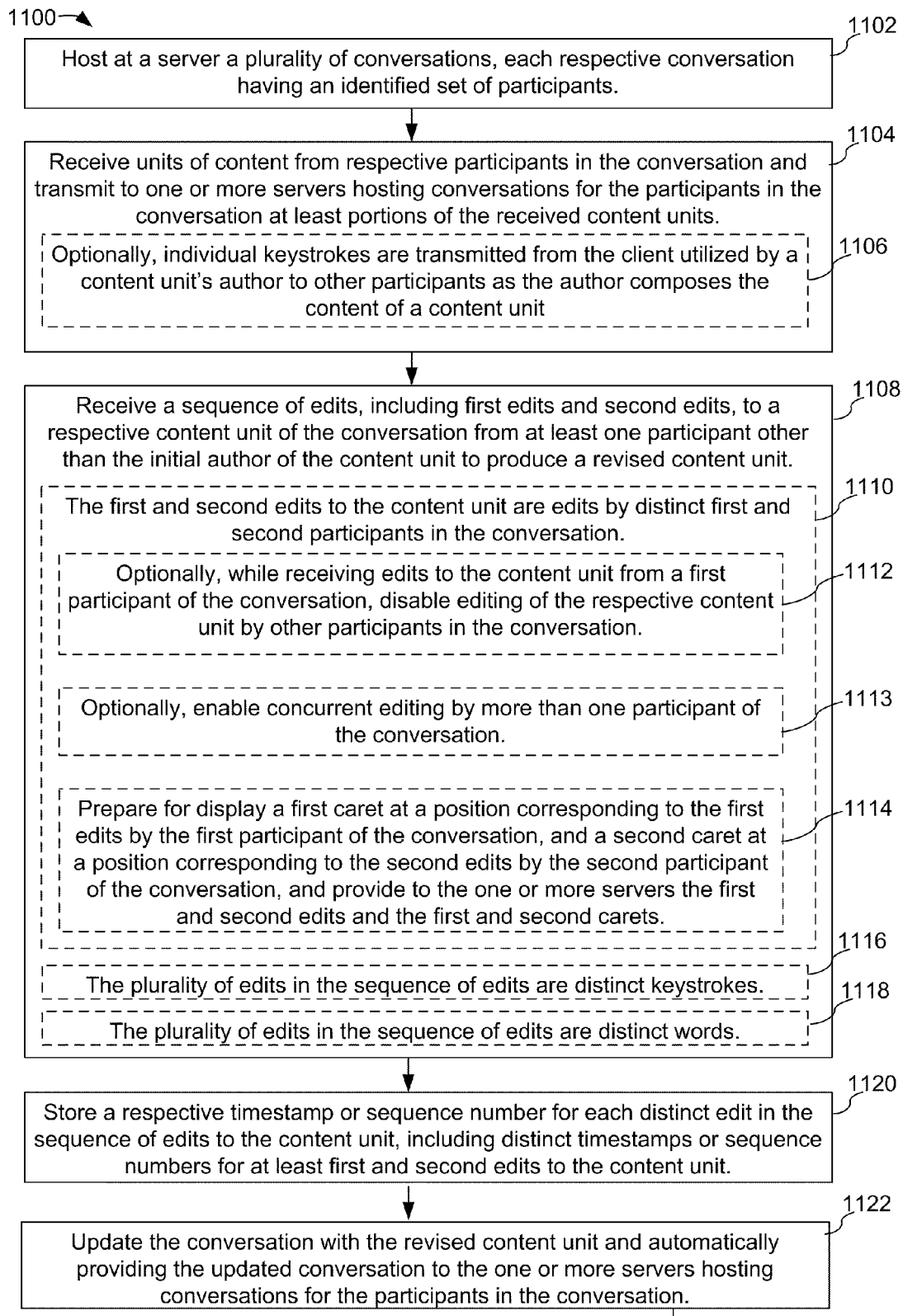
FIGS. 11A-B are flowcharts representing a method for editing, playback and drafting of conversations hosted at a server, according to certain embodiments of the invention.
Figure 11B:
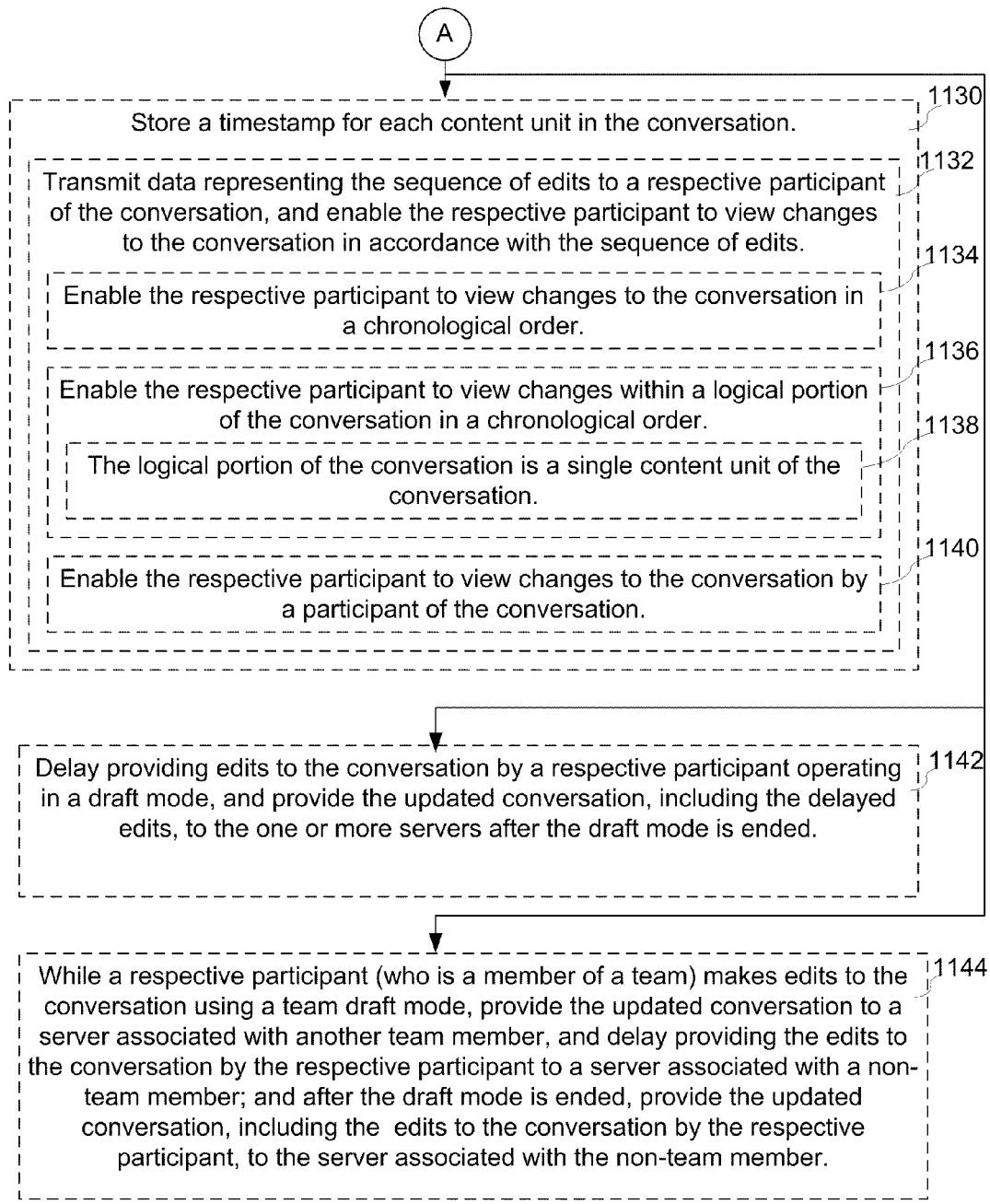

FIGS. 11A-B are flowcharts representing methods for editing, playing back and drafting conversations hosted at a server, according to certain embodiments of the invention. These methods are governed by instructions that are stored in a computer readable storage medium and that are executed by one or more processors of one or more servers, as described.

FIG. 11A shows a method 1100 for hosting conversations at a server (e.g., in hosted conversations database 262, FIG. 2). A server hosts (1102) a plurality of conversations, each having an identified set of participants.

The server receives (1104) units of content (e.g., each content unit stored as a content contribution 326, FIG. 3A) from respective participants in the conversation and transmits to one or more servers hosting conversations for the participants in the conversation at least portions of the received content units. Optionally, individual keystrokes are transmitted from the client utilized by a content unit's author to other participants as the author composes the content of a content unit (1106).

The server receives (1108) a sequence of edits, including first edits and second edits, to a respective content unit of the conversation from at least one participant other than the initial author of the content unit to produce a revised content unit. Optionally, the first and second edits to the content unit are edits by distinct first and second participants in the conversation (1110).

Optionally, or in some modes of operation, editing of the respective content unit by other participants in the conversation is disabled (1112) while receiving edits to the content unit from a first participant of the conversation. Alternately, concurrent editing by more than one participant in the conversation is enabled (1113). As described in more detail below, any conflicts between concurrent edits by different participants are resolved and the resulting consistent content is published to (or made available to) all the conversation participants.

In some embodiments, a first caret (e.g., caret 924 identifying Joe in FIG. 9A) is prepared for display (1114) at a position corresponding to the first edits by the first participant of the conversation, and a second caret (e.g., caret 934 identifying Pat) is prepared for display at a position corresponding to the second edits by the second participant of the conversation, and the first and second edits and the first and second carets (or caret positions) are provided to the one or more servers. Active participants in the conversation (e.g., participants whose clients are currently displaying the conversation) can see the carets associated with concurrent authors/editors of a content unit.

In some embodiments, the plurality of edits in the sequence of edits include distinct keystrokes (1116). In these embodiments, the clients used by active participants in the conversation display updates/edits to the conversation at substantially the same time as they are entered by the author of those update/edits.

In some embodiments, the plurality of edits in the sequence of edits include distinct words (1118). In these embodiments, the clients used by active participants in the conversation display word-by-word updates/edits to the conversation at substantially the same time as they are entered by the author of those update/edits.

A respective timestamp or sequence number is stored (1120) for each distinct edit in the sequence of edits to the content unit, including distinct timestamps or sequence numbers for at least first and second edits to the content unit.

The conversation is updated (1222) with the revised content unit and the updated conversation is automatically provided to the one or more servers hosting conversations for the participants in the conversation.

FIG. 11B continues the method 1100 for hosting conversations at a server, illustrated in FIG. 11A.

In some embodiments, a timestamp (e.g., timestamps 1, 2, 3, 4 indicated by 920, 930, 940, 950, etc., of FIG. 9A and stored in timestamps 341 of FIG. 3B) is stored (1130) for each content unit in the conversation.

Data is transmitted (1132) representing the sequence of edits to a respective participant of the conversation, thus enabling the respective participant to view changes to the conversation in accordance with the sequence of edits.

In some embodiments or modes of operation, the respective participant is permitted to view (1134) changes to the conversation (or a user-specified portion of the conversation) in a chronological order, e.g., even if the changes are spaced apart from each other in the conversation. Stated in another way, in some modes of operation the playback function in a client application displays a sequence of changes to the conversation in chronological order. For example, in FIG. 9B a conversation is played back to show changes to the conversation as a result of adding and editing of content by participants in the conversation.

In some embodiments or modes of operation, the respective participant is permitted to view (1136) a sequence of changes within a logical portion of the conversation in a chronological order, e.g., using the back 972 and forward 974 buttons to navigate through changes in the conversation. Stated in another way, in some modes of operation the playback function in a client application displays a sequence of changes within a logical portion of the conversation in a chronological order. This allows a participant to see sequences of changes in a specific portion of interest in the conversation, without seeing changes in unrelated portions. For example, the logical portion of the conversation for which changes are displayed may be a single content unit of the conversation (1138). Alternately, the logical portion of the conversation for which changes are shown (when using the playback function) are a plurality of user-selected content units of the conversation.

In some embodiments, a respective participant of the conversation is permitted to view (1140) changes to the conversation by another respective participant of the conversation, e.g., to view all changes made by first participant Joe or by second participant Pat, as illustrated in FIG. 9A.

In some embodiments, the server delays (1142) providing edits to the conversation by a respective participant operating in a draft mode, and provides the updated conversation to other participants (e.g., to the servers that host conversations of the other participants, and to the clients used by those other participants) until the respective participant exits the draft mode or releases the conversation edits/updates that he/she has made. For example, edits 1011, 1021 of FIG. 10 are not provided to Team B until after members of Team A (Joe, Pat) approve the edits and end the draft mode. In some embodiments, draft mode information or draft approval information or status is stored in the participant conversation state 372 (FIG. 3B) for the conversation.

In some embodiments, while a respective participant (who is a team member) makes edits to the conversation using a team draft mode, the server provides (1144) the updated conversation to a server associated with another team member (e.g., Joe can see Pat's edits and vice versa), and delays providing the edits to the conversation by the respective participant to a server associated with a non-team member (e.g., Team B cannot see Team A's edits during the draft mode). After the draft mode is ended, the server provides the updated conversation, including the edits to the conversation by the respective participant, to the server associated with the non-team member. Alternately, the conversation edits made during draft mode are provided contemporaneously to the servers associated with all conversation participants, but the changes are marked as draft mode changes and therefore not provided to participants outside the team of the participant making the changes until the draft mode is exited or the conversation updates are approved or released (e.g., by the participant or by the participant's team).

In some embodiments, when a group or team of participants in a first conversation initiates editing of the conversation in a team draft mode, a separate conversation is created. The team members draft content within the separate conversation, and when the team is finished drafting the separate conversation or a portion thereof is merged back into the first conversation, at which point the new or edited content is made available to the other participants in the first conversation.

Concurrency Control

The aforementioned cooperative editing module 736 (FIG. 7) allows multiple participants (clients) to simultaneously edit a conversation, and provides conflict detection and resolution to determine if participants' edits conflict (i.e., meet predefined conflict criteria). At a respective client, a user enters and edits conversation content using an "optimistic user interface," which assumes there is no conflict between content entry and edits made by the user of the client device and other participants in the same conversation, until it is told otherwise by the conversation server that provides conversation hosting services for the client.

Figure 15:
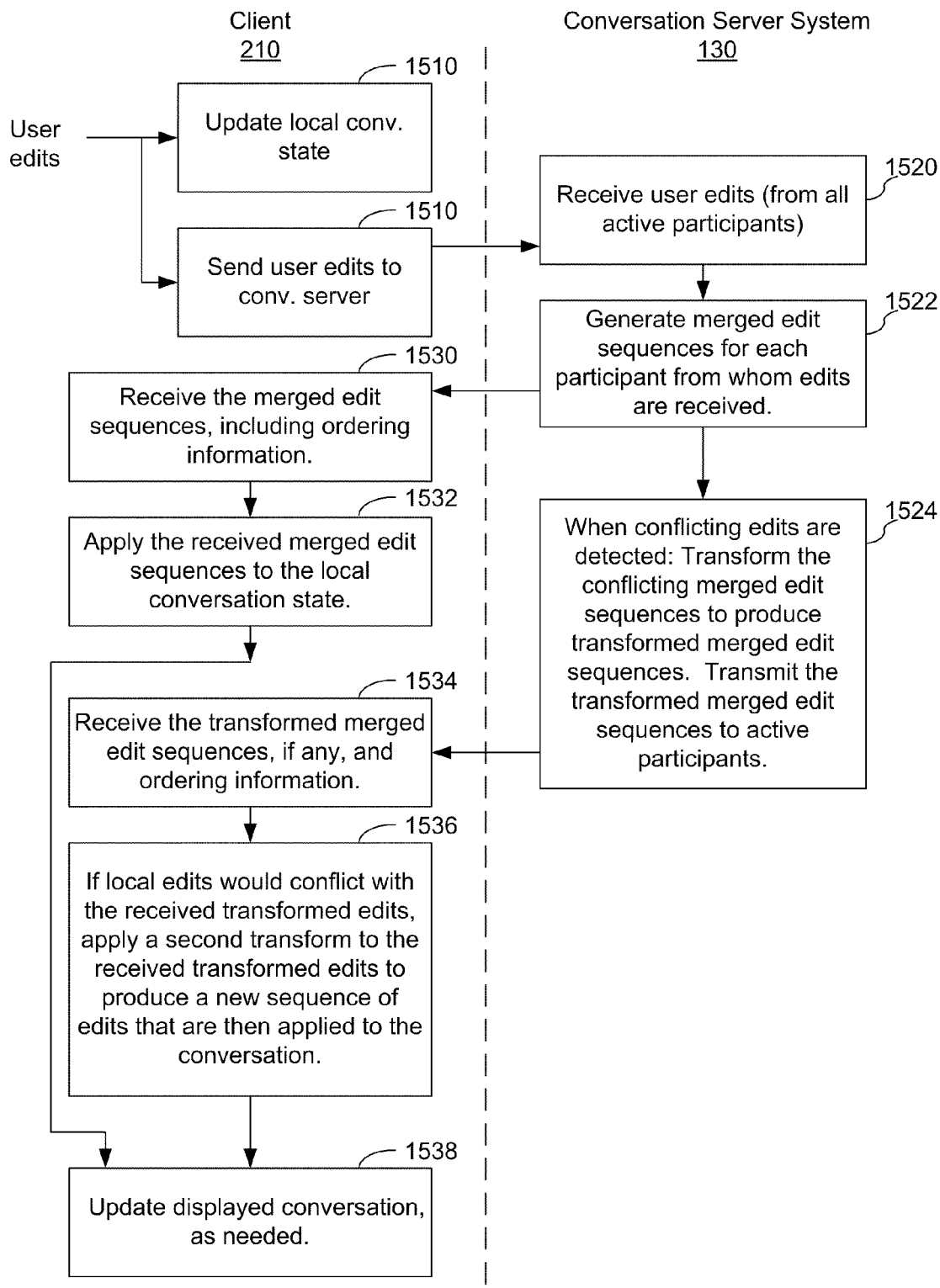
FIG. 15 is a flowchart representing a method of concurrency control at a server, and at a client, when a plurality of participants in a conversation make potentially conflicting edits to the conversation.

Referring to FIG. 15, one or more participants in a conversation make edits to a conversation at their local client (1510), which sends the user edits (1512) to the conversation server that provides conversation services to the client. The user edits made by each participant are received at the conversation server system (1520).

When conflicting changes (edits) are made by two (or more) conversation participants (herein called the "competing participants" for ease of identification, as opposed to any other participants who are not currently making conflicting edits to the conversation), the conflicting edits meet predefined conflict criteria and transformation operations are performed on the edits made by the competing participants so that the state of the conversation on each of the clients is consistent. Stated another way, the transformation operations are performed in response to a determination that the competing participants have made conflicting edits (i.e., edits that meeting predefined conflict criteria). Furthermore, the conversation server reduces the number of transformation operations it needs to perform by merging sequences of edits made at each client into merged sequences of edits (1522), and then performing the transformation operations on the merged sequences of edits by the competing participants (1524). At least one of the resulting transformed sequences of edits is different from the corresponding merged sequence of edits from which it was derived. Respective transformed sequences of edits are transmitted to the clients of the competing participants (and to any other active participants), along with sequencing information (1524, 1534)) to enable each client to apply both locally made edits and the received transformed sequences of edits in the correct order so as to reproduce the correct current state of the conversation (1536).

When non-conflict changes (edits) are made by two (or more) conversation participants, the conversation server still merges sequences of edits made at each client into merged sequences of edits (1522). Each merged sequence of edits is assigned a timestamp and/or sequence number (see description above of conversation log 324, FIG. 3A), and is sent to the clients of the conversation participants (1522, 1530) so that all the participants have a consistent record of conversation state. The respective clients apply the received merged edit sequences to update the locally stored conversation state (1532). Each client at which the conversation is being displayed updates its display of the conversation (1538) in accordance with both the locally made edits and the merged sequences of edits of other participants received from the conversation server.

A special situation requiring special handling at the client is as follows. If, at the time a transformed sequence of edits is received at a client, the participant using the client has made additional changes that conflict, or potentially conflict with the changes recorded in the received transformed sequence of edits, then the client performs a second transformation on the received sequence of edits that anticipates the transforms to be made at the server when it receives the additional changes made at the client. As a result of the second transformation on the received sequence of edits, and the transformation applied by the server to the edits made at the client, the conversation state is made consistent across the clients of the participating users and across the hosting server(s). In other words, each of the clients includes operation transformation instructions, to be applied to received edits made at other clients, that take into account transformations that will be performed by the server on the edits made at those clients operations. The state of the conversation at each step along the way is represented by a corresponding sequence number, which is used by both the clients and the conversation hosting server to ensure that the transformations made at the clients and servers are coordinated or synchronized and produce a consistent conversation state. (1536).

It is noted that locally made edits are sent to the conversation server (1512) on a continuing basis, and so the edits made subsequent to the received transformed sequence of edit are also sent to the conversation server, and the process of generating merged sequences of edits, and generating transformed sequences of edits (if needed), continues. As a result, the state of the conversation at each client reflects interleaved sequences of edits by the active participants, where some of the sequences of edits are transformed sequences that have been transformed in order to achieve a consistent state at each of the clients used by the conversation participants.

As discussed above, in some embodiments, concurrency control operations for a conversation are performed at both the conversation server system 130 that hosts the conversation and, when necessary, by clients that receive transformed edits that conflict with intervening edits made at those clients.

The quantity of edits that are merged into a merged edit sequence (1522) depends, at least in part, on the rate at which the participant is entering edits. Another factor that may affect the quantity of edits that are merged is whether other participants are editing the same content unit at the same time. For example, when there are no competing edits being made by other participants, relatively long sequences of edits may be merged. However, when competing edits are being made by other participants, relatively short sequences of edits (e.g., limited to edits made in a period of N seconds, where N is typically less than or equal to 0.5) are merged. In other embodiments, edits (which includes content entry, as well as revisions of previously entered content, and changes to shared metadata) by a participant are sent right away to other active participants in the conversation, if any, without performing any merging. When conflicts are detected, a transformation is generated (at the hosting conversation server, or at another server) for each individual edit operation before forwarding it to the other active participants. As noted above, a second level transformation on a respective received transformed edit is performed at the receiving client when the received transformed edit conflicts with an edit made at the local client since the time corresponding to the conversation state sequence number.

To keep latency, defined as the delay between edit entry and its appearance at the clients of other participants, low, edits by participants are typically sent to the other active participants as quickly as possible, without regard to edit sequence merging. Fast transformation and forwarding of edits during "live conflicts" (when two or more participants are revising the same portion of the conversation) keeps the participants accurately apprised of the evolving conversation state during live conflicts. Since merging operations and then transforming them to the active participants would increase latency, operation merging is either not used, or used only for very small time windows, during live conflicts. On the other hand, for purposes of recording the conversation history in the conversation log 324 (FIG. 3C) for playback, sequences of operations performed in short periods of time are merged. As noted above, a conversation log record 385 can include a list of authors 390 identifying multiple authors of a change to the conversation state when more than one author is editing the same conversation at the same time or during overlapping times. Furthermore, when there are no conflicts between participants, entire sequences of editing by a participant, from the start of an edit sequence until the user selects the "done" icon or button, are merged into a single edit sequence for storage in a single conversation log record 385 (FIG. 3C).

Figure 12:
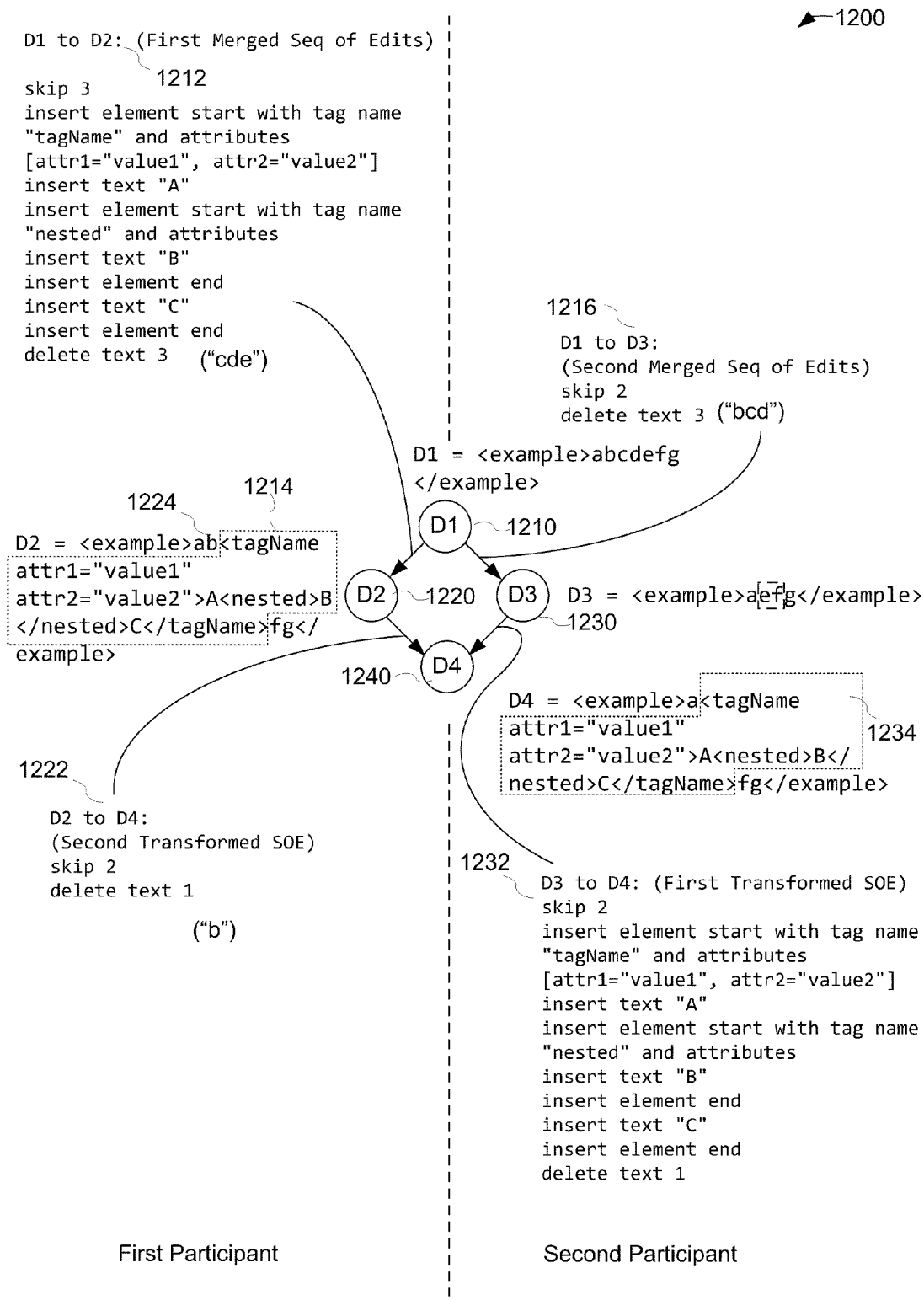
FIG. 12 illustrates a process diagram showing concurrency control between a plurality of potentially conflicting edits received from a plurality of participants.

FIG. 12 illustrates a process diagram showing the application of concurrency control between a plurality of potentially conflicting edits received from two participants. The example illustrated in FIG. 12 shows transformation operations of ASCII text including XML tags and content. Operations are performed at a first participant (client) and at a second participant (client).

A first sequence of edits to a respective content unit of the conversation is received from a first participant of the conversation, and the first sequence of edits is converted into a first merged sequence of edits (1212). A second sequence of edits to a respective content unit of the conversation is received from a second participant of the conversation, and the second sequence of edits is converted into a second merged sequence (1216).

The first merged sequence of edits (1212) is transformed to produce a first transformed sequence of edits (1232), and the second merged sequence is transformed to produce a second transformed sequence of edits (1222). The first transformed sequence of edits (1232) is sent to the second participant, and the second transformed sequence of edits (1222) is sent to the first participant. At the first client, the first merged sequence (1212) is applied to an initial conversation state D1 to produce an intermediate conversation state D2, and then the second transformed sequence of edits (1222) is applied to the conversation state D2 to produce a new conversation state D4. At the second client, the second merged sequence of edits (1216) is applied to the initial conversation state D1 to produce an intermediate conversation state D3, and then the first transformed sequence of edits (1232) is applied to the intermediate conversation state D3 to produce the same new conversation state D4 as produced at the first client. Thus, the transformed sequences of edits, 1232 and 1222, are generated so that when they are applied to the conversation state after the application of locally made edits (corresponding to merged sequence of edits for that client), the conversation state in both clients converges to a consistent state.

In the example of FIG. 12, each ASCII text character has a size of one, and each starting and ending XML tag has a size of one. In the example of FIG. 12, "delete text" refers to a text deletion component of the operation, and "delete element" refers to an element deletion operation. The number accompanying a text or element deletion operation refers to the size of the element deletion. Both "insert element" is used to add XML tags to a conversation unit, and "insert text" is used to insert text. Transformations of merged sequences of content update operations (edits) take into account the position of each operation in the conversation unit, and also take into account duplicate operations (e.g., completing operations that delete the same text), or more generally operations that render other competing operations moot).

The initial conversation state D1 1210 comprises a first string:

> D1=<example>*abcdefg*</example>

The second (or revised) conversation state D4 1240 comprises a second string:

> D4=<example>a<tagName attr1="value1" attr2="value2">
> A<nested>B</nested>C</tagName>fg</example>

Intermediate conversation state D2 1220 comprises a third string:

> D2 = <example>ab<tagName attr1="value1"
> attr2="value2">A<nested>B</nested>C</tagName>
> fg</example>

Intermediate conversation state D3 1230 comprises a fourth string:

> D3=<example>*aefg*</example>

The first merged sequence of edits 1212 provides the following edits:

> skip 3
> insert element start with tag name "tagName" and attributes [attr1="value1", attr2="value2"]
> insert text "A"
> insert element start with tag name "nested" and attributes
> insert text "B"
> insert element end
> insert text "C"
> insert element end
> delete text 3 (e.g., text cde)

When the first merged sequence of edits 1212 is applied to the initial conversation state D1 1210, the result is intermediate conversation state D2 1220, described above. A dotted box 1214 indicates the portion of state D2 in which changes were made to D1 by the first merged sequence of edits 1212.

The second transformed sequence of edits 1222 provides the following edits:

> skip 2
> delete text 1

The second transformed sequence of edits 1222 deletes the letter "b" 1224 from the intermediate conversation state D2. The result of this operation is the second (or revised) conversation state D4 1240.

The second merged sequence of edits 1216 provides the following edits:

> skip 2
> delete text 3 (e.g., delete "bcd")

The second merged sequence of edits 1216 deletes the letters "bcd" from the first conversation state D1. The result of applying the second merged sequence of edits 1216 to the first conversation state D1 is the intermediate conversation state D3 1230.

The first transformed sequence of edits 1232 provides the following edits:

> skip 2
> insert element start with tag name "tagName" and attributes [attr1="value1", attr2="value2"]
> insert text "A"
> insert element start with tag name "nested" and attributes
> insert text "B"
> insert element end
> insert text "C"
> insert element end
> delete text 1

The first transformed sequence of edits 1232 changes the intermediate conversation state D3 by adding the material indicated by the dotted line 1234 on FIG. 12. The result of this operation is the second conversation state D4.

It is noted that the merging of edit sequences makes the detection of conflicting edits (by different users) easier, thereby reducing the amount of computational resources needed for concurrency control. Conflicting edits are detected, for example, when the transformation of a merged sequence of edits would change the position of at least one edit operation. For example, conflicting edits are detected when performing the first merged sequence of edits would change a position of at least one edit operation in the second merged sequence of edits. As another example, conflicting edits are detected when performing the second merged sequence of edits would change a position of at least one edit operation in the first merged sequence of edits. Conflicting edits are also detected when first and second merged sequences of edits (by two distinct participants) include overlapping delete operations. Transforming a merged sequence of edits for which there is an overlapping delete operation (i.e., overlapping with edit operations by another participant) produces a transformed delete operation that deletes fewer elements of the respective content unit than the respective delete operation of the merged sequence of edits.

In some embodiments, when first and second merged sequences of operation include overlapping operations, including a redundant operation, the first transformed sequence of edits does not include the redundant operation.

In some embodiments, distinct conversation (or content unit) version numbers are associated with the state of a respective conversation (or content unit) before and after each merged sequence of edit operations. Similarly, distinct version numbers are associated with the state of a respective conversation (or content unit) before and after each transformed sequence of edit operations. In some embodiments, distinct timestamps are associated with each distinct version number of the conversation (or content unit).

Figure 13:
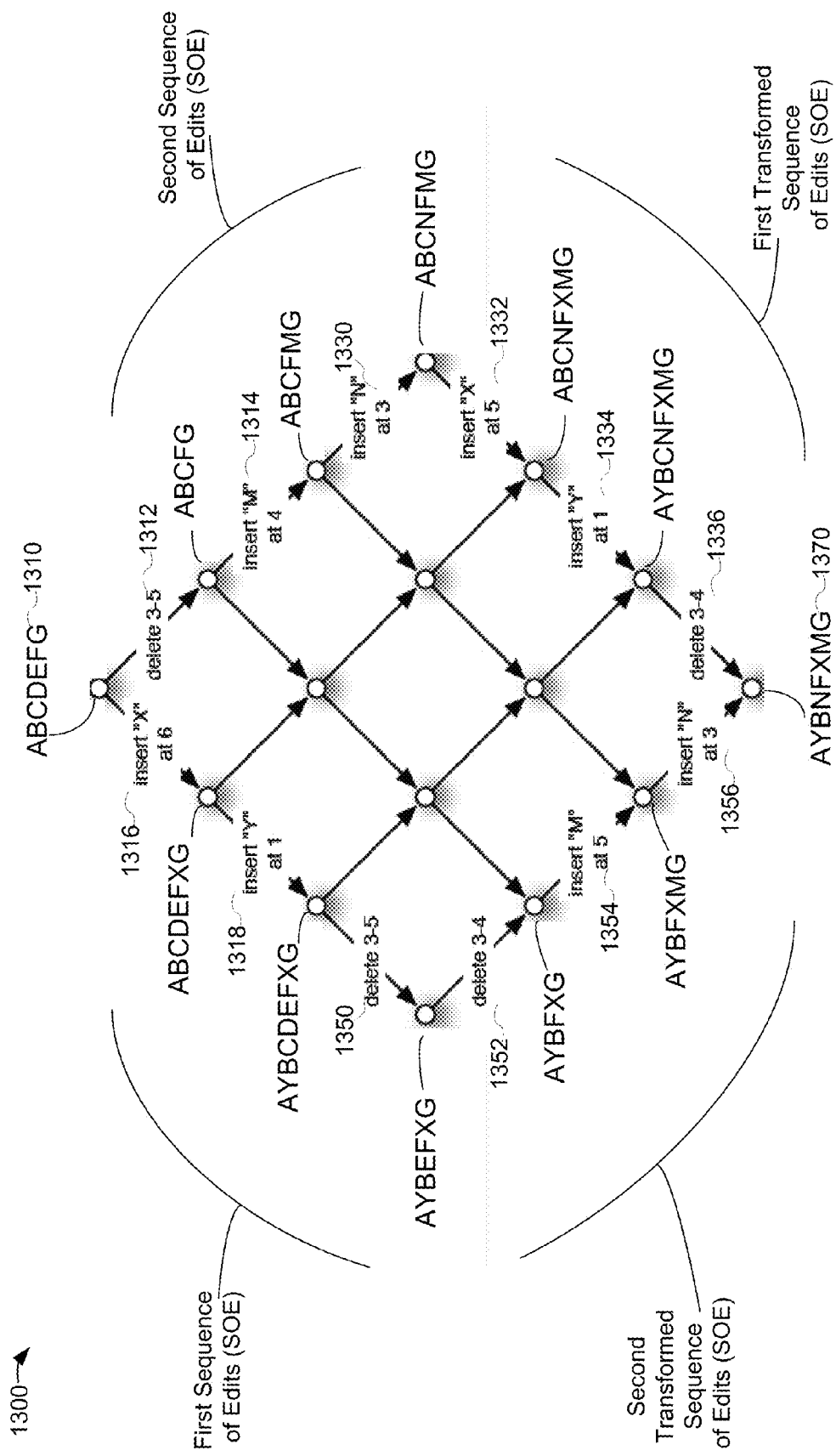
FIG. 13 illustrates two sequences of separate edit operations, both performed on the same content unit, where one sequence is received from a first participant and a second sequence is received from a second participant in a conversation, and transforms thereupon.

FIG. 13 illustrates a sequence of separate edit operations to a content unit received from a first participant and a sequence of separate edit operations received from a second participant in a conversation.

A starting point for this sequence is a first content unit state 1310, comprising the text "ABCDEFG". A first sequence of edits is received from a first participant, including:
- 1316: insert "X" at 6, resulting in text ABCDEFXG
- 1318: insert "Y" at 1, resulting in text AYBCDEFXG
- 1350: delete 3-5, resulting in text AYBEFXG A second transformed sequence of edits is received from the second participant and applied at the first participant, including:
- 1352: delete 3-4, resulting in text AYBFXG
- 1354: insert "M" at 5, resulting in text AYBFXMG
- 1356: insert "N" at 3, resulting in text AYBNFXMG.

This is the final content unit state 1370.

Again, referring to the starting state 1310, comprising the text "ABCDEFG", a second sequence of edits is received from a second participant, including:
- 1312: delete 3-5, resulting in text ABCFG
- 1314: insert "M" at 4, resulting in text ABCFMG
- 1330: insert "N" at 3, resulting in text ABCNFMG A first transformed sequence of edits is received from the first participant and applied at the second participant, including:
- 1332: insert "X" at 5, resulting in text ABCNFXMG
- 1334: insert "Y" at 1, resulting in text AYBCNFXMG
- 1336: delete 3-5, resulting in text AYBNFXMG.

This is the final content unit state 1370, and is the same content unit state as achieved using the first sequence of edits and the second transformed sequence of edits.

Since there are a plurality of separate edits, there are also a plurality of transforms (indicated by the plurality of arrows/paths from content unit state 1310 to content unit state 1370). In this embodiment, each transform has to be calculated for each path, which consumes processor resources and takes time.

Figure 14:
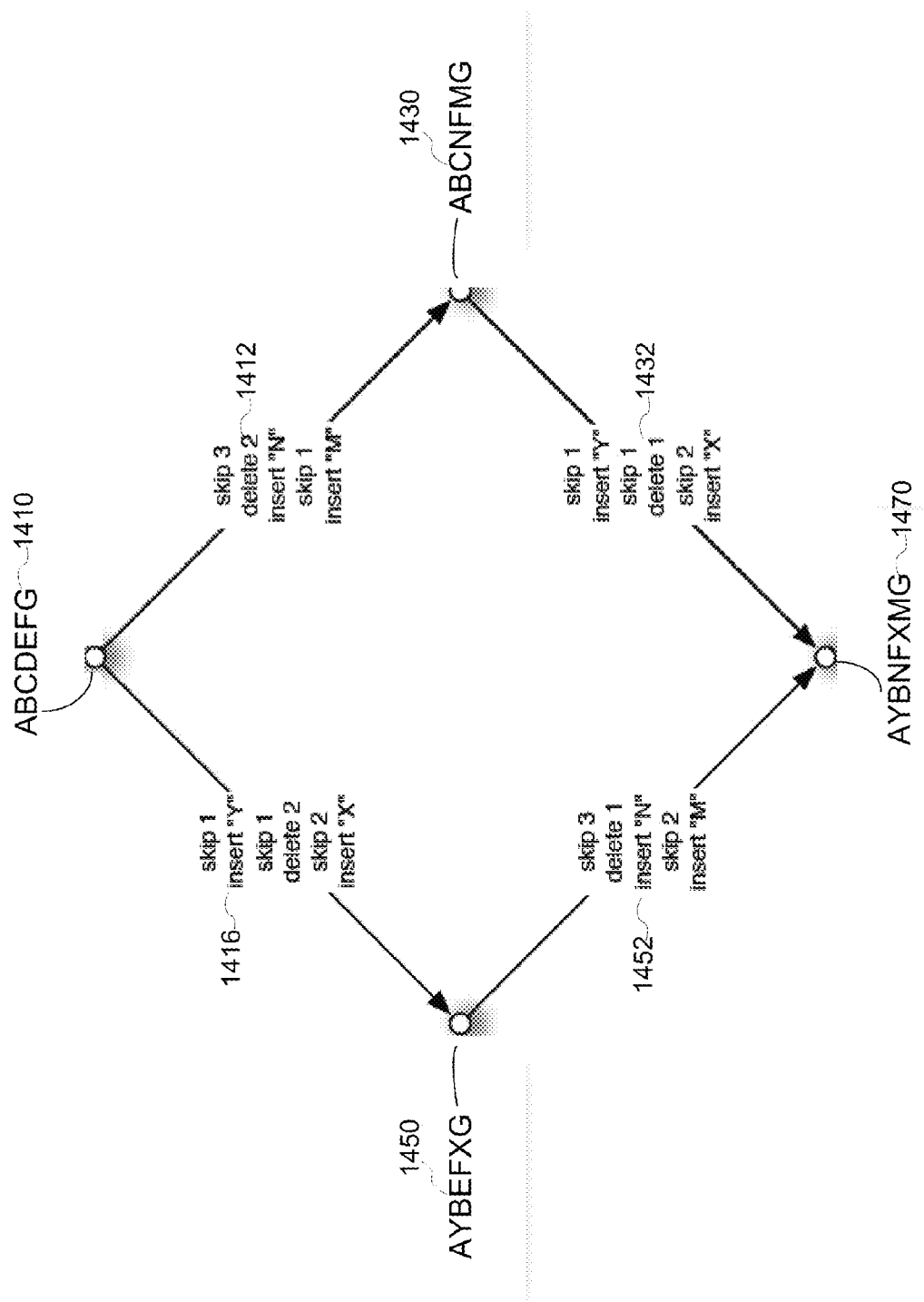
FIG. 14 illustrates first and second sequences of edit operations, applied to a content unit of an electronic conversation, received from a first participant and a second participant, respectively, and transformed sequences of merged edit operations corresponding to the received first and second sequences of edit operations.

FIG. 14 illustrates 1400 a sequence of merged edit operations to a content unit received from a first participant and a sequence of merged edit operations received from a second participant in a conversation, and transforms thereon.

A starting point for this sequence is a first content unit state 1410, comprising the text "ABCDEFG" and corresponding to the starting content unit state 1310 of FIG. 13.

A first merged sequence of edits is received from a first participant, including:
- 1416: skip 1, insert "Y", skip 1, delete 2, skip 2, insert X, resulting in text AYBEFXG, content unit state 1450.

A second transformed merged sequence of edits is received from the second participant and applied at the first participant, including:
- 1452: skip 3, delete 1, insert "N", skip 2, insert M, resulting in text AYBNFXMG, end point 1470.

Again referring to the starting content unit state 1410, comprising the text "ABCDEFG", a second merged sequence of edits is received from a second participant, including:
- 1412: skip 3, delete 2, insert "N", skip 1, insert "M", resulting in text ABCNFMG, content unit state 1430.

A first transformed merged sequence of edits is received from the first participant and applied at the second participant, including:
- 1432: skip 1, insert "Y", skip 1, delete 1, skip 2, insert "X", resulting in text AYBNFXMG, which is the final content unit state 1470.

This is the final content unit state 1470 as the state achieved by applying the first merged sequence of edits and the second transformed merged sequence of edits.

Since the individual edits (e.g., as in FIG. 13) are merged into a sequence of edits in FIG. 14, there are fewer transforms required using the embodiment of FIG. 14 versus that of FIG. 13 (indicated by the pair of arrows/paths from point 1310 to point 1370). In this embodiment, one transform has to be calculated for each path, which is a lower processing burden than the embodiment of FIG. 13. The embodiment of FIG. 14, using merged sequences of edits, thus provides advantages of a reduced calculation requirement.

Other Applications

Another application that may be associated with the server hosting the conversation includes a contextual spell checker and correction application. Such an application can be used to find common misspellings, and to disambiguate intentionally defined words. Such an application may use an error model to determine if an work is spelled or used correctly. The model may find common errors based on letter reversal, phonetic similarity, location in a conversation or letter, or using other means. The application may provide on-the-fly, context based text correction. In some embodiments, the application provides a user-specific overlay of words that a user frequently uses or that the user has defined. In some embodiments, the application may insert a tag with a suggestion for a word that it considers to be incorrectly spelled, such that any participant (not just the author) can address and correct the word, if necessary.

Another application that may be associated with the server hosting the conversation includes a contextual name display, using context-dependent disambiguation. In some embodiments, this disambiguation may provide space efficiency when displaying names. For example, a close friend or work colleague may be displayed using a first name only or a picture, whereas a stranger may be displayed with full name, title, etc. A set of rules (defined by the system or by the user or both) may be used to determine who to display and in what manner.

Another application that may be associated with the server hosting the conversation includes a language translation (machine translation) application. This machine translation application may use the spell checking and/or a context sensitive dictionary to translate between languages.

In some embodiments, these (and other) applications use an application protocol interface (API) to interact with the server hosting the conversation. In some embodiments, the application allows a participant to reserve a namespace for that participant's personal applications, which the participant may share with other participants.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method of hosting electronic conversations, comprising:

at a computer system having one or more processors and memory storing programs for execution by the one or more processors, hosting a plurality of conversations, each having an identified set of participants, the hosting including, for a respective conversation:

providing content of the conversation to the identified set of participants of the conversation, including:

receiving content representing a portion of the conversation from one or more participants of the identified set of participants of the conversation; and transmitting the received content to the other participants of the identified set of participants;

while a first participant of the identified set of participants is providing or editing a portion of the content of the conversation:

enabling a second participant of the identified set of participants to edit the portion of the content; and after the conversation between the first participant and the second participant has begun for a time period:

adding an additional participant to the conversation by:

providing content of the conversation to the additional participant that includes all content provided to the identified set of participants;

adding the additional participant to the identified set of participants; and enabling the additional participant to edit the content of the conversation, including content added to the conversation before the additional participant was added to the identified set of participants;

wherein the plurality of conversations including the conversation are instant messaging conversations, and participants in the conversation are instant messaging participants.

2. The method of claim 1, further comprising:

maintaining, for a respective user of the computer system, a full list of conversations in which the user is a participant;

updating a status of each respective conversation in the full list of conversations when a state of the respective conversation changes; and sending to the user a first list that comprises at least a portion of the full list of conversations in which the user is a participant, the first list sent to the user including status information for the listed conversations.

3. The method of claim 1, comprising:

maintaining, for a subscriber of the computer system, a full list of conversations in which the subscriber is a participant;

updating a status of a respective conversation in the full list of conversations when a state of the respective conversation changes; and sending to the subscriber a first list that comprises at least a portion of the full list of conversations in which the subscriber is a participant, the first list sent to the subscriber including status information for the listed conversations.

4. The method of claim 1, wherein providing the content of the conversation includes:

providing presence information, the presence information including online presence of the one or more participants from whom content is received.

5. The method of claim 1, further comprising, for a respective conversation of the plurality of conversations:

maintaining, for a respective participant of the respective conversation, a state of the respective conversation in regard to the respective participant; and providing, to the respective participant, the state of the respective conversation in regard to the respective participant.

6. The method of claim 5, wherein providing the state of the respective conversation in regard to the respective participant includes:

providing read status of content of the respective conversation in regard to the respective participant.

7. The method of claim 5, wherein providing the state of the respective conversation in regard to the respective participant includes:

providing labels, if any, specified by the respective participant for the respective conversation.

8. The method of claim 5, wherein providing the state of the respective conversation in regard to the respective participant includes:

providing information indicating that the respective participant has chosen not to be notified of an update to content of the respective conversation.

9. The method of claim 5, wherein providing the state of the respective conversation in regard to the respective participant includes:

providing formatting information corresponding to the state of the respective conversation, for displaying the respective conversation or a portion thereof.

10. The method of claim 1, wherein providing the content of the conversation includes:

formatting content of the conversation to be compatible with one or more content types that a client device associated with a respective participant of the identified set of participants has been configured to receive; and transmitting the formatted content to the client device.

11. The method of claim 10, wherein formatting content of the conversation includes at least one of:

compressing multimedia data associated with the formatted content, providing a subset of multimedia data associated with the formatted content, and removing multimedia data associated with the formatted content.

12. The method of claim 1, further comprising:

receiving, at the computer system, a search request from a participant of the conversation; and providing, to the participant, a search result, including content from at least one conversation of the plurality of conversations, in response to the search request.

13. The method of claim 1, further comprising:

receiving, at the computer system, a search request from a participant of the conversation; and in response to receiving the search request:

providing, to the participant, a search result identifying one or more conversations that match the search request.

14. The method of claim 1, further comprising:

storing, at the computer system, for a respective participant of the identified set of participants, a contact list associated with the respective participant.

15. The method of claim 1, wherein the conversation includes a plurality of content units; the method further comprising:
prior to providing a content to a participant of the conversation,
verifying that the participant is authorized to receive the content.

16. The method of claim 1, wherein the identified set of participants of the conversation includes:
one or more subscribers of the computer system, and
an email participant identified by an email address.

17. The method of claim 1, wherein the identified set of participants of the conversation includes:
one or more subscribers of the computer system, and
a web log on which content of the conversation is posted.

18. A hosted conversation system, comprising:
a computer system, the computer system including:
one or more processors;
memory; and
one or more programs, stored in the memory, for execution by the one or more processors, the one or more programs including: instructions for hosting a plurality of conversations, each having an identified set of participants, the instructions for hosting including, for a respective conversation:
instructions for providing content of a conversation to the identified set of participants of the conversation, including:
instructions for receiving content representing a portion of the conversation from one or more participants of the identified set of participants of the conversation; and
instructions for transmitting the received content to the other participants of the identified set of participants;
instructions for, while a first participant of the identified set of participants is providing or editing a portion of the content of the conversation:
enabling a second participant of the identified set of participants to edit the portion of the content; and
instructions for, after the conversation between the first participant and the second participant has begun for a time period:
adding an additional participant to the conversation by:
providing content of the conversation to the additional participant that includes all content provided to the identified set of participants;
adding the additional participant to the identified set of participants; and
enabling the additional participant to edit the content of the conversation, including content added to the conversation before the additional participant was added to the identified set of participants;
wherein the plurality of conversations including the conversation are instant messaging conversations, and participants in the conversation are instant messaging participants.

19. The hosted conversation system of claim 18,
wherein the computer system is one of a set of computer systems that host electronic conversations,
wherein a respective computer system of the set of computer systems is associated with a different subset of users, and
the respective computer system includes instructions for hosting, at the respective computer system, conversations initiated by a subset of users associated with the respective computer system.

20. The hosted conversation system of claim 18, wherein the instructions for providing content of the conversation to the identified set of participants includes include:
instructions for providing a uniform view of the conversation to a plurality of participants of the identified set of participants.

21. A non-transitory computer readable storage medium having stored therein instructions, which when executed by one or more processors in a computer system, cause the computer system to:
host a plurality of conversations, each having an identified set of participants, by:
providing content of a conversation in the plurality of conversations to the identified set of participants associated with the conversation, including:
receiving content from one or more participants of the identified set of participants; and
transmitting the received content to the other participants of the identified set of participants;
while a first participant of the identified set of participants is providing or editing a portion of the content of the conversation:
enabling a second participant of the identified set of participants to edit the portion of the content; and
after the conversation between the first participant and the second participant has begun for a time period:
adding an additional participant to the conversation by:
providing content of the conversation to the additional participant that includes all content provided to the identified set of participants;
adding the additional participant to the identified set of participants; and
enabling the additional participant to edit the content of the conversation, including content added to the conversation before the additional participant was added to the identified set of participants;
wherein the plurality of conversations including the conversation are instant messaging conversations, and participants in the conversation are instant messaging participants.

22. The method of claim 1, wherein the first participant and the second participant modify the same instance of the portion of the content of the conversation.

23. The method of claim 1, wherein the content of the conversation includes:
a message entered by a participant of the identified set of participants; and
one or more responses to the message entered by another participant of the identified set of participants.

* * * * *